Feb. 21, 1950 M. G. HILPERT 2,497,887
PANELED BUILDING CONSTRUCTION
Filed June 30, 1943 9 Sheets-Sheet 9
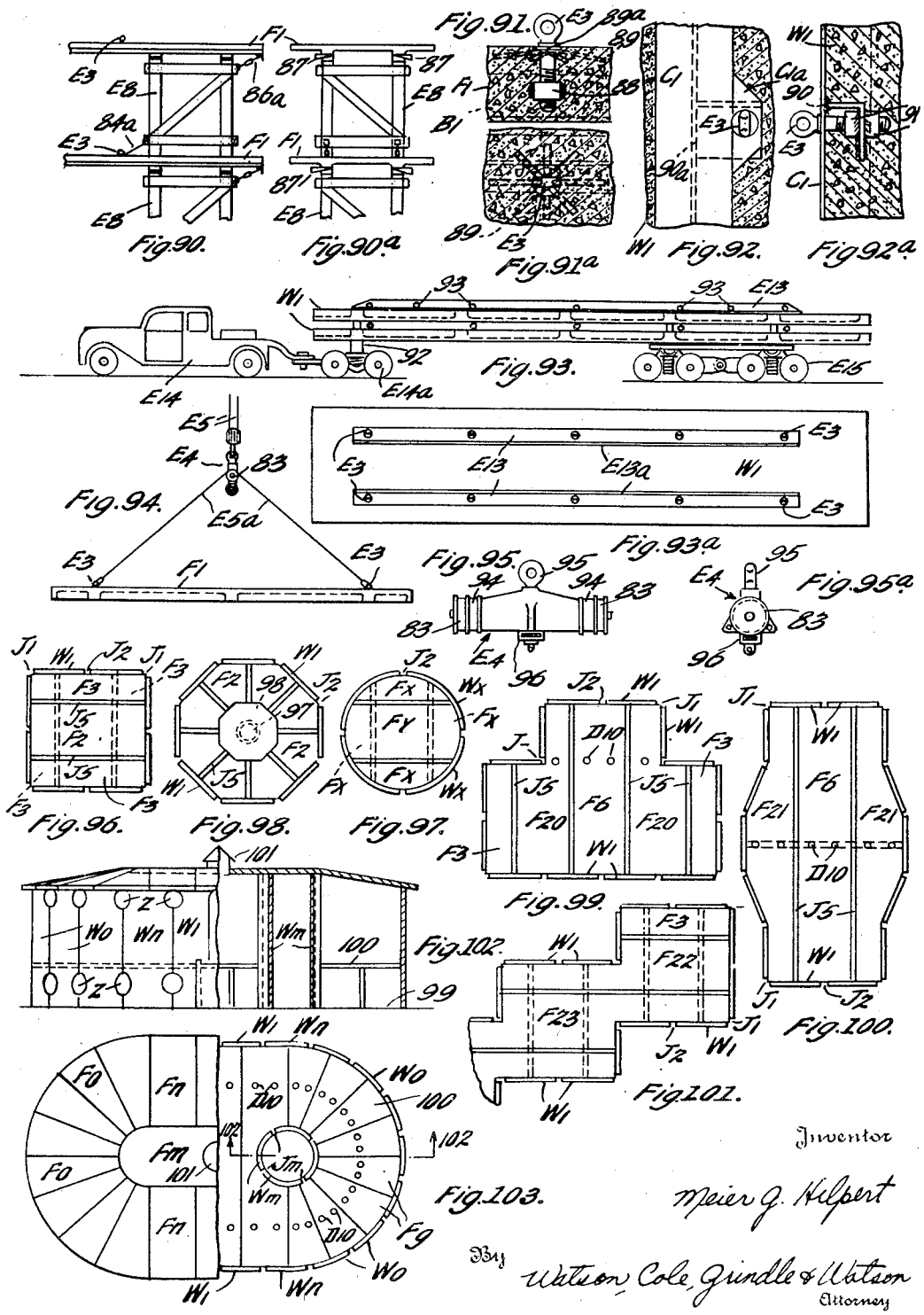

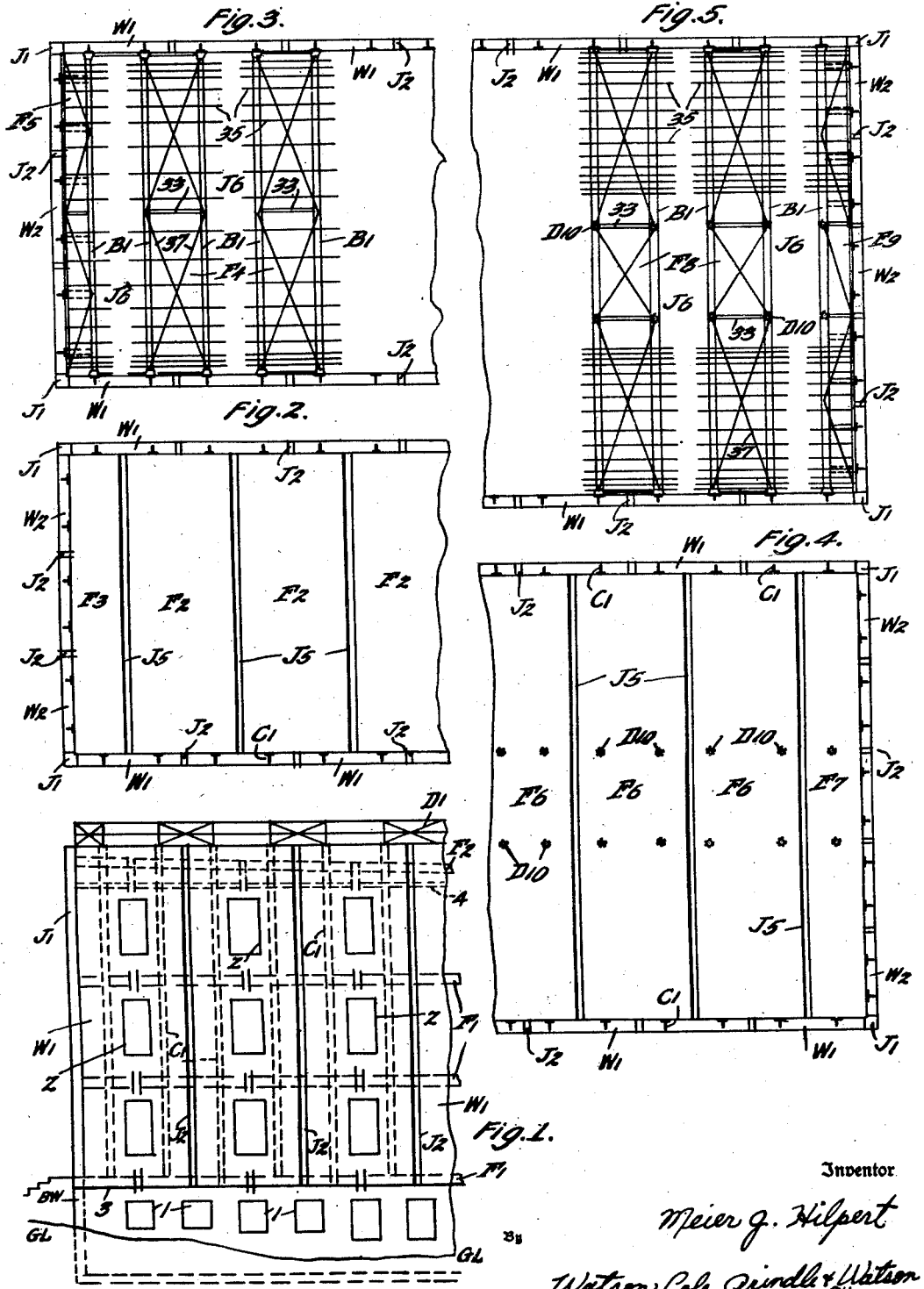

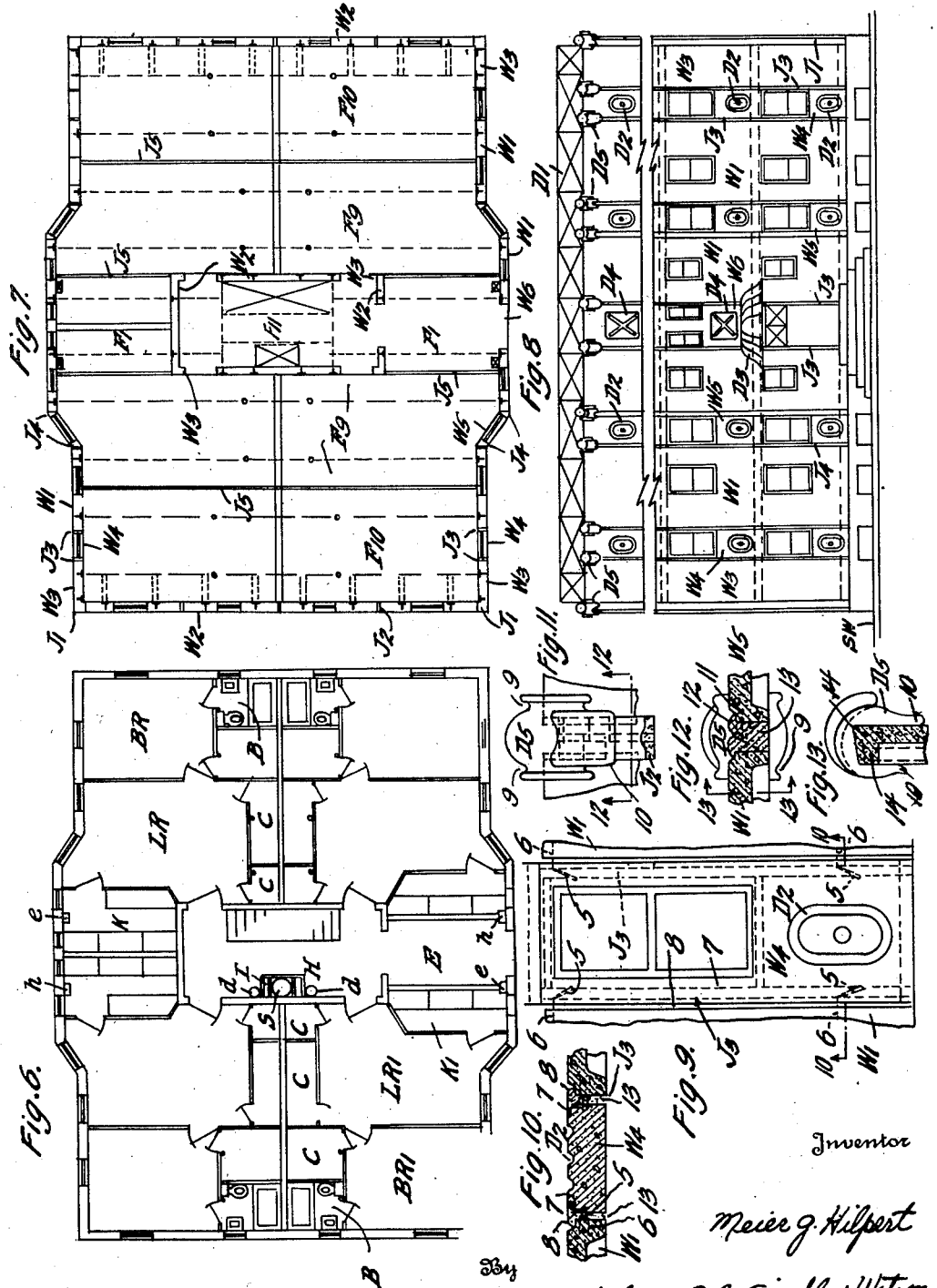

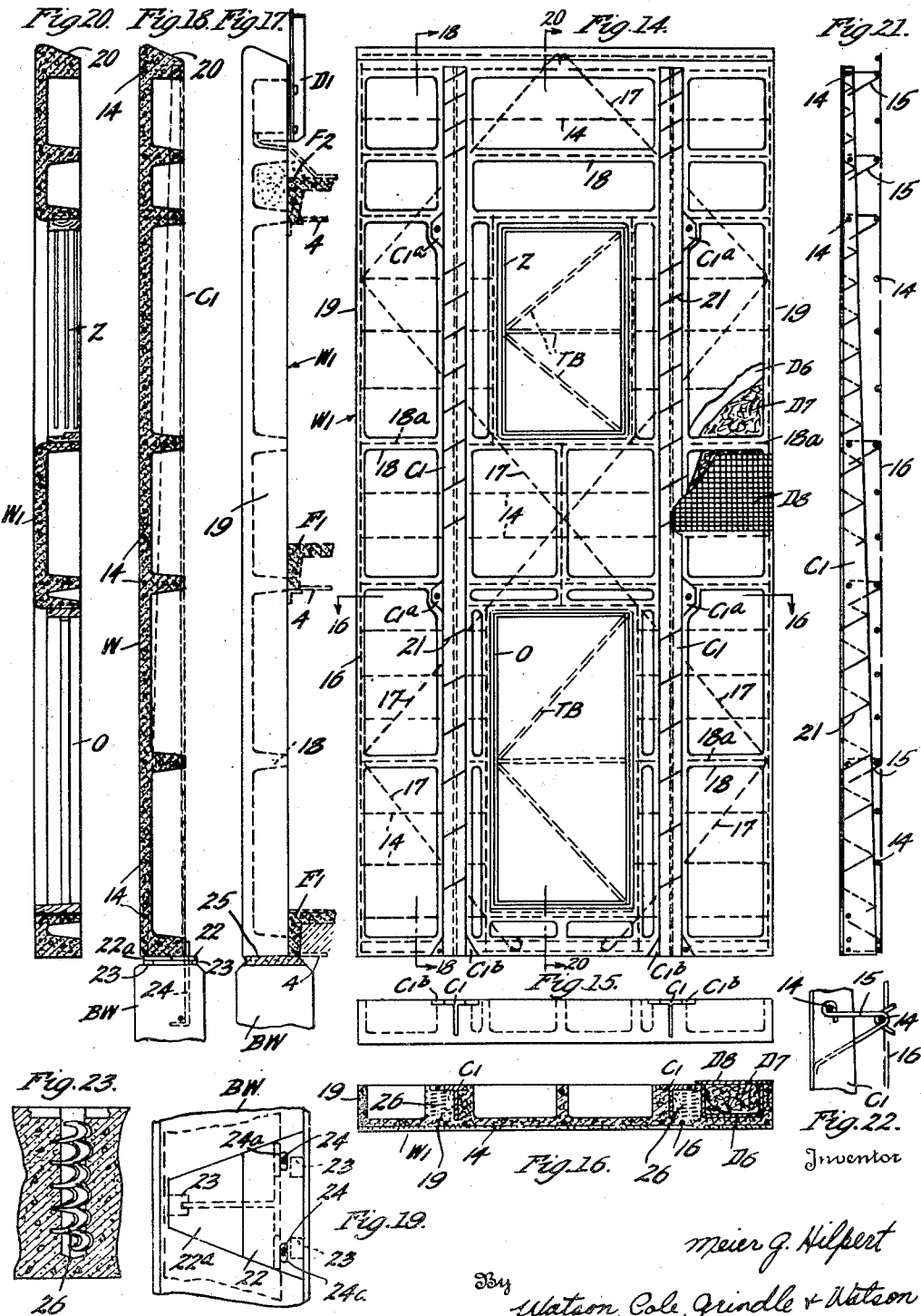

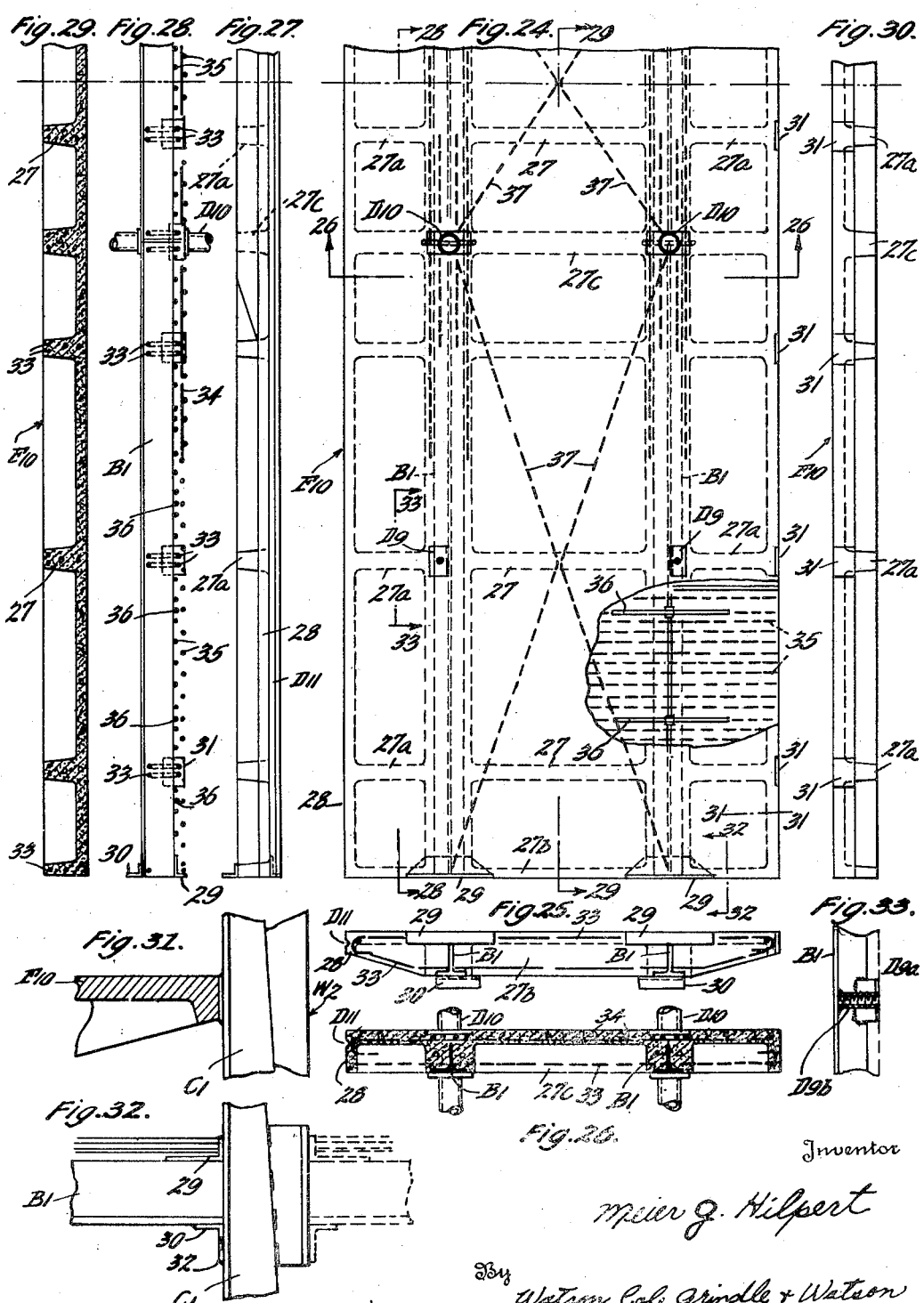

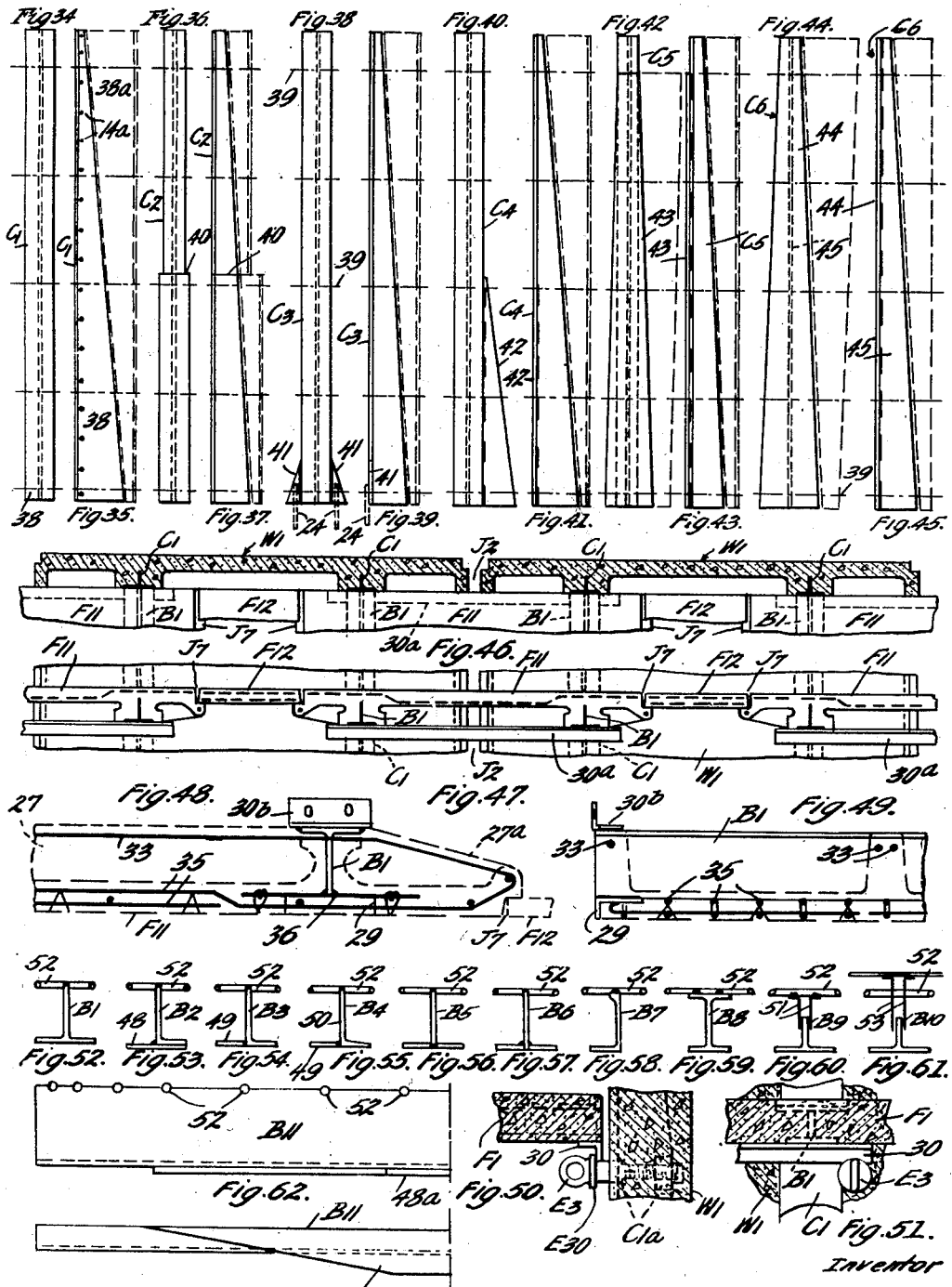

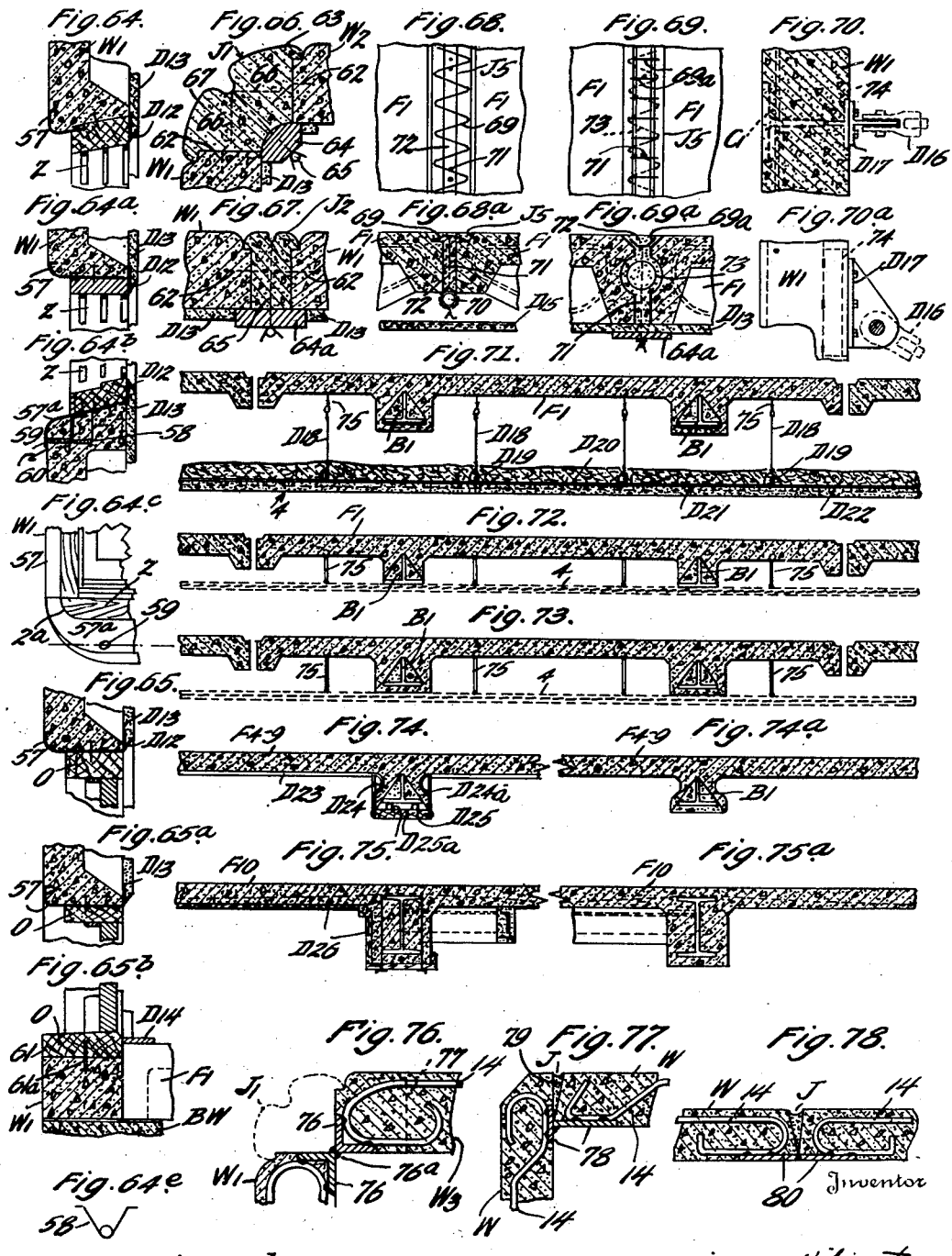

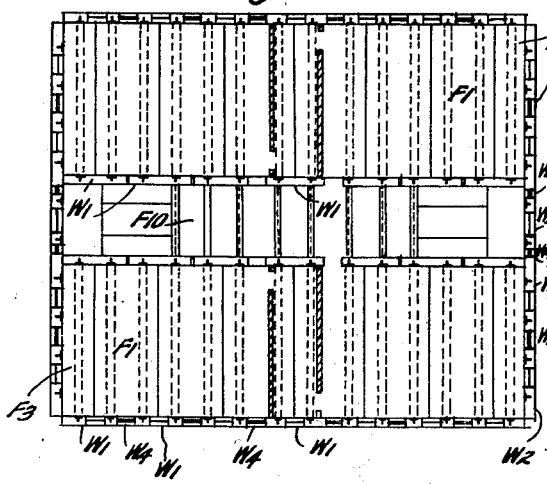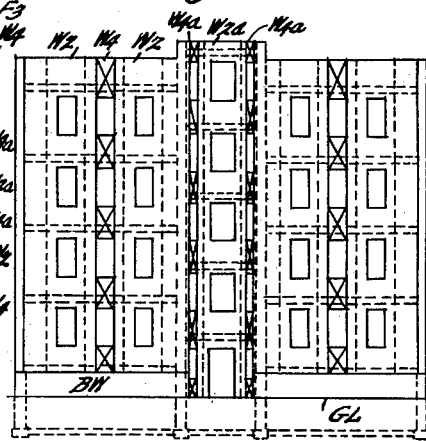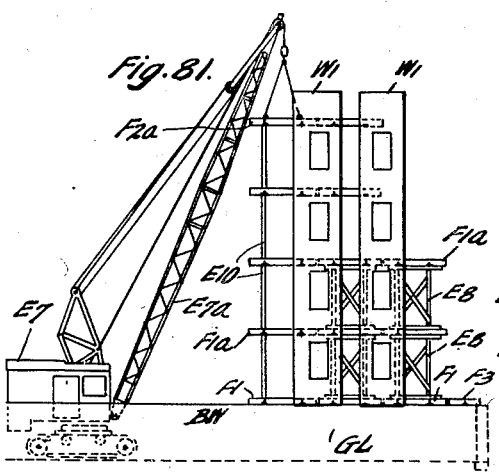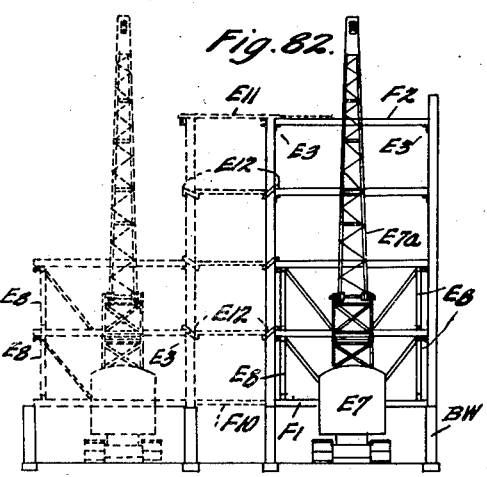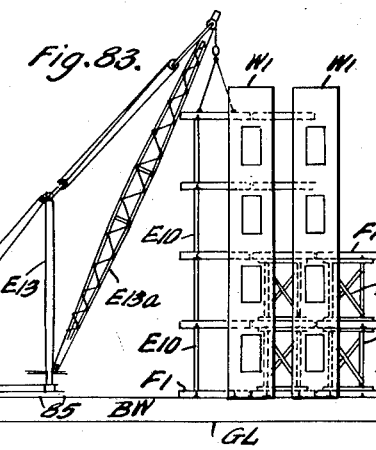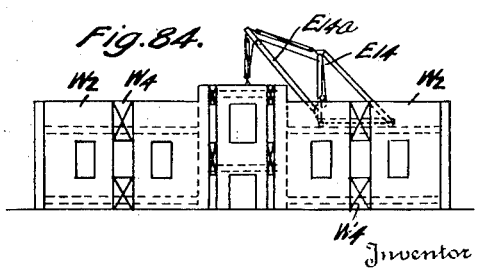

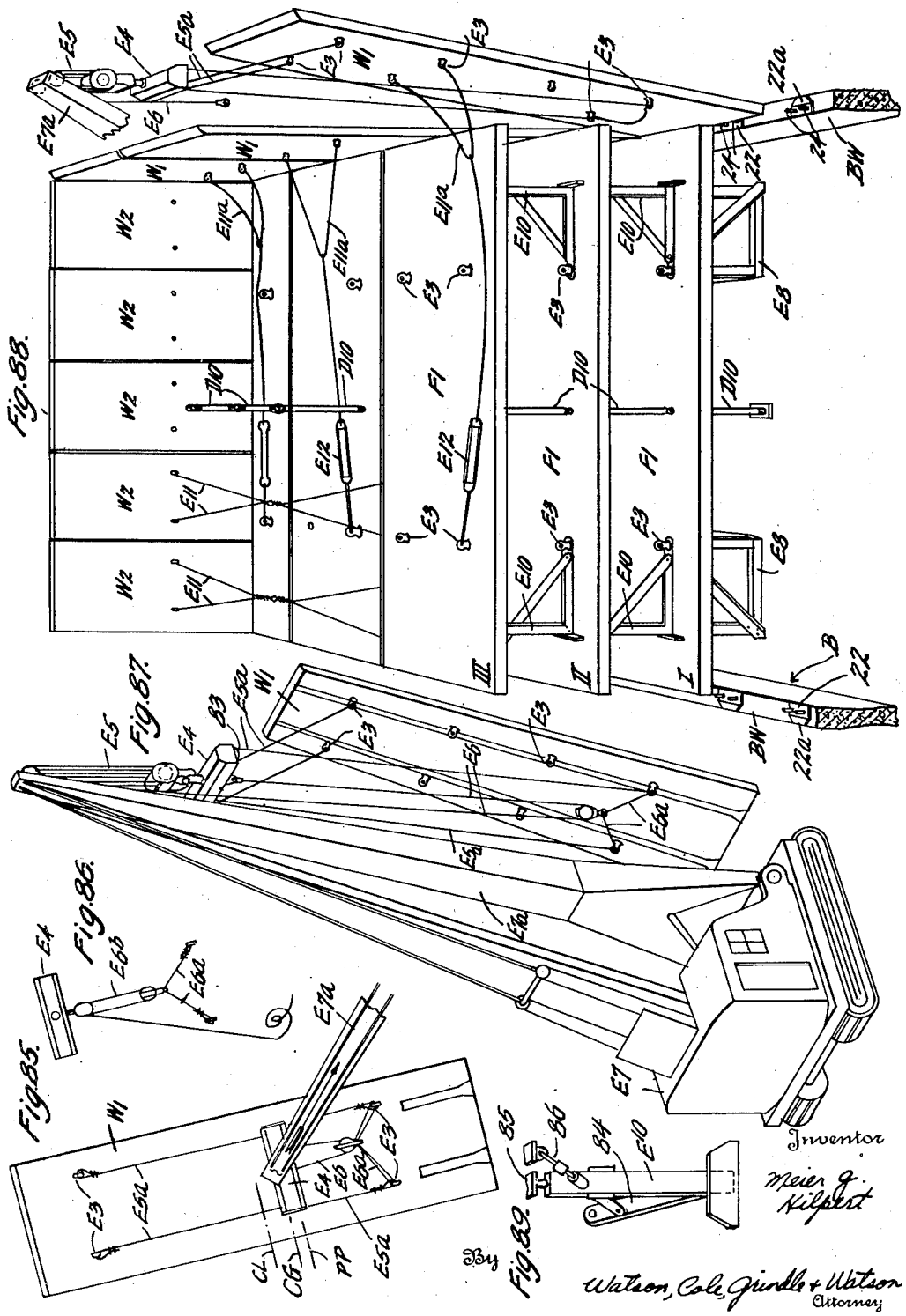

Patented Feb. 21, 1950

2,497,887

UNITED STATES PATENT OFFICE 2,497,887

PANELED BUILDING CONSTRUCTION

Meier George Hilpert, Bethlehem, Pa.

Application June 30, 1943, Serial No. 492,926

13 Claims. (Cl. 72—1)

This invention relates to paneled constructions and more particularly to constructions of this class which are especially adapted for providing walls, floors, roofs, elevated roadways, or the like, preferably in prefabricated structures.

The principal object of the invention is to provide an improved type of structure of the class described in which novel means are employed in interlocking, interconnecting, and assembling the component parts of the structure. This general object and purpose involves the provision of novel panel units embodying features which make effective the safe and expeditious handling, erecting, installing, interlocking, and assembling thereof, in sizes never before considered practicable in prefabricated structures, and which also obtain many other benefits in addition to those obviously inherent in such assembled paneled constructions.

The present invention contemplates the utilization of the composite beam panels of the general type disclosed in my U. S. Patent No. 2,271,592 of February 3, 1942, but also provides numerous novel added features of construction and interconnection of the several units, as well as methods of assembly to attain the completed structures. An improved panel provided by the present invention is especially adapted for complete or partial prefabrication, wherein one or more beams are arranged in the form of prefabricated panels of either simple or multiple continuous span lengths for the substantially vertical and horizontal surfaces of a wide variety of types of structures. There are preferably two of these composite beams or columns embodied in each of the panels and these beams or columns are so spaced, and the panels are of such width, as to permit the staggering of the panels of one of such surfaces with respect to each panel of the abutting surface. Thus the panels of the one surface will interlock with and, when welded, bolted, or riveted thereto, will connect two panels of the abutting surface to make a structure of any desired rigidity, strength, and size within the limits of capacities for handling such prefabricated panels or combinations thereof. In certain forms of construction each panel has an effective width, including joints, equal to an arbitrary division of one side of the structure and consists of two beams or columns spaced at the quarter points of said division so that the span therebetween equals the sum of the two cantilevering spans one on either side of the central span plus the two half-joints. Thus, when assembled in an interlocking position, the two columns of a vertical panel will support and connect one beam each of two adjacent horizontal panels and each horizontal panel will connect the columns of two adjacent vertical panels. It will be apparent that the vertical and horizontal panels on the opposite side of the structure will similarly interlock, brace and support each other. Also, the vertical panels of the closing sides or ends of the structure will support and connect with the side edges of the end panels of the horizontal surface and at the corners of the structure, when necessary, panels of half the effective width will be introduced to complete the vertical or the horizontal surfaces.

It will also be apparent that with multiples of horizontal surfaces such as roof and floors, the panels of alternate surfaces may be quarter-turned in a horizontal plane if desired and interlock with the vertical panels of the closing sides or ends of the structure, for greater strength and rigidity or for other purposes. Interlocking may be more easily effected and the benefits of the invention obtained in this way in the case of regularly bounded structures, for example, those having plans in the form of circles, regular polygons, crosses, and other shapes.

Although the principles of the present invention are applicable to a great variety of structures—from elevated roadways, whether rail or highway, having walls or part walls thereunder or alongside, to dams and retaining walls—the invention will be illustrated and described herein in what is probably the most obvious field of utility, namely, that of providing shelter for man, beast, or wares. Also, although a plane panel is indicated for most constructions, the invention is equally applicable to curved or warped surfaces as in the case of silos, tanks and reservoirs, curved ramps and dams, and conical igloos, and the like.

The invention contemplates the provision, in a new paneled construction, of novel preferably prefabricated panels each having provisions therein for handling, upending, assembling, and interconnecting them with other similar panels. They are also provided with joint constructions, some of ordinary simplicity and others of a special nature to provide completed structures for a wide range of use, strength, stability, beauty, and exceptional durability. The invention also provides means facilitating novel methods of assembling said structures at their sites.

In their preferred form, the panels employed comprise two parallel composite beams of simple or continuous span whether for vertical or horizontal use, since similar stresses obtain in both positions and the composite materials—concrete and steel—are increased in strength progressively corresponding to increased bending and loading toward the bottoms of the vertical panels, and in accordance with the moments and shears obtaining in the horizontal panels. The preferred spacing and allocation of the beams in the panels as above indicated obtains the benefits of interlocking; of stability—providing two bases and anchors for the vertical panels and four point wall support for the horizontal panels; of lesser depth and weight for the area of the panel because of composite construction; and of quarter point support for the lifting, upending, and securing anchors provided for the safe and expeditious handling and assembling of the units.

Prefabrication, especially for all steel members, is greatly to be preferred, in order to most satisfactorily provide exact positioning, adequate connections, and thorough inspection of all steel beam elements, shear members, struts, diagonals, and the numerous reinforcing elements and anchors. For secondary horizontal surfaces such as hall floors, and for other special cases, partially prefabricated or skeleton panels may be installed in order to expedite the completion of a structure, but this entails subsequently providing complete forms and shoring for the concreting in situ of such skeleton panels. Full prefabrication of the complete composite steel and concrete panels is preferred in order to obtain all of the benefits and savings of factory methods such as in utilization of platens and jigs and the work of skilled craftsmen under uniform conditions, and also to obtain the full strength value of the concrete and steel composite beam which must be fully supported either on a platen or in forms during the pouring and curing of the concrete to make available the total composite—concrete plus steel—strength necessary for carrying dead and live and other loadings.

It is preferred that the panels be fully prefabricated or cast with the wear surfaces thereof down on the platen; that is, the exterior surfaces of walls for ordinary buildings, the interior surfaces of silo walls, the upper surfaces of roof panels and floor panels. This provision permits of vibrating the wear surfaces upon the platen to insure the greatest possible density where most needed, and permits the concentrating of the most economical, and specially provided. wear resisting and strengthening materials at this wear surface, and of proportioning and grading the materials above the wear surface for various purposes such as providing gradations of strength, insulating properties, decoration, or fireproofing. This manner of construction also facilitates the forming for joints around and structural recesses in the panels with a minimum expense for forms, allows of eliminating excess materials and weight from the central or neutral portion of the panels, and permits applying additional insulation materials, plaster lath, plaster decorations for exposed beams, and anchors for elements to be provided on the upper surfaces as cast on the platen.

The invention contemplates the provision of joint fillers between the panel units which are preferably cast at the site of the structure and these fillers generally comprise plastic materials of less compressive strength than the materials of the panels themselves. The joints may be provided with reinforcing members interlocking with the adjacent panels as for transferring figured live load shears from panel to panel, and also may contain special reinforcing elements and anchors for spandrel panels as special wide joint fillers.

Since my invention contemplates the complete assembling of all panels and then connecting—by welding, bolting, or riveting—for all dead and live loadings; and, since all vertical panels are stable—each having two columns and supports—it is evident that all major settlements due to dead loadings and constructional misalignments, will have taken place prior to armoring and casting the joints and that therefore said joints need only transfer certain wind and secondary loadings. Hence, the provision of a joint plastic of less strength behind a flexible armoring will insure the concentration of all of the minor and later occurring settlements—such as those due to temperature, stress, and time settlements—as slight cracks in the plastic part of the joint back of the flexing armor or wear surface. It is equally evident that the use of an easily crushed cast plastic, for example slag, "Haydite," or cinder concrete, and a thin flexible armoring sheet in conjunction with semi-flexing welded connections of panel to panel, would concentrate larger seismic disturbances as cracks in such special joint plastic and thus only minor inside repairs at such joints would be necessary after a damaging earthquake.

The joint structures for the walls preferably comprise thin preformed metallic units of aluminum or enameled steel, overlapping and weather tight and of such contour as to permit snapping them in position between ledges or recesses formed in the edges of adjacent panels. These edges are also provided with reinforcements to anchor the plastic backing of the joint, to interlock with adjacent panel elements, to support the weight of the completed joint from the adjacent panels, and to dress or ornament the surface of the structure.

These joints between panels may vary considerably in width. They may be extremely narrow or may include relatively wide ornamented corner constructions. They may also contain ports or windows and spandrels in metal frames. Also, the joint armoring may vary in length depending on the manufactured sheet lengths or the floor to floor distances, or again they may vary according to the decorative effects desired. All joints, including the plastic backing, are designed for adjustment to all constructional misalignments of the erected panels and to equal or exceed the durability of the wear surfaces of the panels and to afford at least equal insulating values. The joint structures for the floors and roofs or substantially horizontal surfaces may likewise be extremely narrow and contain therein the elements for transferring live load shears and affording equivalent wear surfaces only, or they may be wide and specially formed, and the edges of the abbreviated cantilevering spans of the adjacent horizontal panels may support as joint structures a series of suspended span slabs, or gratings, or special expansion panels according to the nature, use, and demands of the completed construction. It will be seen that the invention thus provides a great variety of panel and joint constructions which may vary as to design, strength, and dimension.

The maximum size of the panels employed is determined primarily by roadway clearances. Otherwise transportation and erection of such units presents no particular problem since modern steel construction and erection practices have developed factory cranes, traveling derricks, trailer and platform trucks, and crawler and truck cranes of wide varieties and capacities amply sufficient to handle panels of the size contemplated by the invention. However, a secondary limitation to the size of the panels results from the engineerng economic dictum that safety and strength in field handling and erect' n must not require any considerable additional quantity of materials, either concrete or steel, over the basic building design requirements. Hence, wall panels of perhaps 10 stories in height (that is about 80 feet in length) and of a width of from 10 feet to 15 feet are probably the largest sizes practicable. The limitation here is not so much on the basis of panel weights, which may amount to from 30 to 40 net tons, but upon the fact that roadway widths are generally limited to from 10 feet to 15 feet. Other minor limitations on the size and nature of the panels result from the requirements that exterior wear surfaces must be kept intact, that is, not punctured for attachments, and that certain special tools and equipment employed shall serve a maximum of useful purposes in the economic assembly and support of the panels and the completion of the structure at the site.

The method of erection assumes that the panels together with all permanent accessories, including interior columns if used, and all temporary accessories such as floor supporting towers, bents and shores, and the usual and special tools shall be delivered at the site as required. Horizontal panels are to be received right side up, and vertical panels generally with their inwardly facing sides uppermost, this being provided for at the factory, whenever necessary, by rotating the platens through 180°. All panels are preferably provided with prefabricated anchoring attachments for certain novel, removable, all-purpose eye bolts and are to be employed for anchoring columns. temporary towers, or bents to the panels. and to provide connections for plank clamps, ratchets, shores, guys, and auxiliary tackle. These eye bolts are also useful for supporting and clamping horizontal panels to the vertical panels as they are being erected and to provide. together with certain embedded spiders. spaced panel weight distributing connections for pennants or slings to a special swiveling spreader, which latter member is an important accessory of the present invention. This spreader is provided for swiveling attachment to the main falls of the erecting boom and is of a length approximating the spacing of the two beams of the panel skeletons. The spreader is provided at each end with fixed and braked rotatable spools to receive two double socketed slings of variable length which are to be attached to the panel preferably at four exactly computed eye bolt positions.

The erection operation of horizontal panels comprises centering the spreader over the center of gravity of the panel with the slings trained about the spools, leveling the panel and lifting it to position, the necessary tilting to bring it to level being accomplished by two manually operated auxiliary falls between the spreader and each end of the panel. The erection of inclined panels, as for example for roofs or ramps, is similarly effected except that one coil of each sling may run on the braked or fixed spools to hold the angle desired. The upending and positioning of vertical panels demands more exacting control and requires longer slings so that the spreader may top the parapet wall and so that the slings may loop the rotatable spools of the spreader, and also requires the assistance of a heavy two-part runner line auxiliary falls or a manually operated falls. In the case of the vertical panels, the spreader is first centered approximately above the center of gravity of the panel with the runner falls strained, and then the panel is raised to over half its height above the truck. Then by lowering the runner falls only, the upending to about 90° is quickly accomplished and the runner falls disconnected. Next, the panel two column base is positioned on the edges of two half-base plates, steel on steel, and with a ratchet or falls is pulled "to face" against the previously positioned floor panels. The outer halves of the supporting base plates are then placed and sl mmed to bear and then grouted. The entire panel base is fully grouted to the foundation only after all dead loads are applied. The erection of the structure is planned to start with the positioning of a minimum number of horizontal panels supported temporarily, some on the foundations and others on towers, after which vertical panels and additional horizontal panels are progressively erected to the end that a minimum of temporary supports and equipment is required.

From the foregoing, it is apparent that the provision of panels with spaced beams, transverse beams or struts, transverse, diagonal and temperature reinforcing elements as for conventional building design requirements, is important in handling and erecting these units, and that the interlocking of the panels is essential to economically stepped assembly and cubic or triplanar bracing and rigidity as opposed to attempting to stabilize—even against moderate wind pressures—a group of horizontal and vertical panels of non-interlocking design, by means of temporary guys during erection, and permanent diagonals or buttresses thereafter.

Additional and specific objects of the invention include the following:

To provide a construction employing full composite beam design for the floors, roofs, and walls—all main members—of all types of shelter construction, thus achieving maximum structural economies;

To provide a new type of paneled shelter construction employing fully the bracing effects of steel cage construction, and requiring only a fraction of the steel usual in the steel cage type;

To provide a paneled construction having exterior walls without any horizontal joints or ledges and with a minimum of vertical joints, the latter to have great impenetrability;

To provide a prefabricated paneled construction whereby, for a given specification of stresses, loadings, fireproofing, insulation, dampproofing, etc., the wall, floor, and roof panels may be made longer, wider, lighter, of less depth and have less deflection. all tending to reduce the cost per square foot per panel and thus obtain a maximum cubage for the expended dollar;

To provide in a prefabricated paneled construction novel panels which are integrally stable for handling, hauling, and erecting, and arranged to be interlockingly assembled, thus providing greater stability and rigidity to the structure in which they are employed;

To provide an arrangement of panels in a prefabricated paneled construction, for resistance and fusion welding in the prefabrication or partial prefabrication thereof, and to provide for rigid, semi-rigid, or flexing welded connections in the interlocked assembling of the panels, all of which permits meeting various design problems and reducing costs;

To provide a paneled construction figurable for assumed seismic probabilities and movements and having provision for reducing damage to said construction resulting from seismic disturbances;

To provide, for a prefabricated paneled construction, the integral parts, tools, equipment, and methods and sequences for economically and expeditiously erecting the construction at its site;

To provide a better shelter of prefabricated paneled construction as concerns permanency, ease of maintenance, fire prevention, wind and seismic safety, resistance to bombardment, reductions in amortization and first costs;

To provide for residence purposes a building as economical, livable, durable, structurally safe, fireproof and damp proof as is now provided for industrial and commercial purposes by the better type of office building;

To adapt the prefabrication and erection of a complete building—walls, floors, and roof—to conform to now existing shop practices, trucks, equipment, tools, and methods which are employed to fabricate and erect steel cage buildings so economically and expeditiously in all parts of this country; and To provide a type of shelter construction which will be particularly suited for post war work programs, in employing unskilled, semi-skilled, and skilled labor in proper proportions, in distributing the payroll nationally in proportion to population and which is equally applicable to the construction of warehouses, offices, institutional and insular buildings, group housings, and farm buildings.

Still further objects and features of novelty will be apparent from the following specification when read in connection with the accompanying drawings in which several embodiments of the invention are illustrated by way of example.

In the drawings:

Figure 1 is a fragmentary diagrammatic view in elevation of a side or long wall of a building embodying the principles of my invention.

Figure 2 is a diagrammatic plan view of horizontal sectional view of the building.

Figure 3 is a view similar to Figure 2 except that the floor or roof panels are partially prefabricated as skeleton panels.

Figure 4 is a view similar to Figure 2 showing a wider building in which the horizontal panels are of three continuous spans, resting upon four spaced supports.

Figure 5 is a view similar to Figure 4 but showing skeleton panels.

Figure 6 is a first floor architectural plan view of an apartment building, in the prefabrication and construction of which the principles of the present invention have been applied.

Figure 7 is a view similar to Figure 6, showing the same layout, but indicating diagrammatically the outline, construction, and assembly of the prefabricated panels employed.

Figure 8 is a front elevation, in somewhat diagrammatic form, of a multiple storied building having the plan shown in Figure 7.

Figure 9 is a fragmentary view in front elevation of a portion of certain of the spandrel panels employed in the construction of the building shown in Figure 8.

Figure 10 is a transverse sectional view taken on line 10—10 of Figure 9.

Figure 11 is a view in front elevation of the upper portion of a joint between wall panels and showing a parapet cap which may be employed therein.

Figure 12 is a transverse sectional view taken on line 12—12 of Figure 11.

Figure 13 is a vertical sectional view taken substantially on line 13—13 of Figure 12.

Figure 14 is a view in elevation of the inwardly facing side of one of the wall panels.

Figure 15 is a bottom plan view of the panel shown in Figure 14.

Figure 16 is a transverse sectional view taken on line 16—16 of Figure 14.

Figure 17 is a view in side elevation of the panel with portions of the connected structure shown in cross section.

Figure 18 is a view in vertical section taken on line 18—18 of Figure 14.

Figure 19 is a fragmentary plan view of the foundation wall of the building showing supporting means for one of the panel columns.

Figure 20 is a vertical sectional view taken on line 20—20 of Figure 14.

Figure 21 is a view in side elevation of one of the wall panel columns and associated reinforcing and supporting elements.

Figure 22 is a fragmentary view of a portion of the column shown in Figure 21 on an enlarged scale.

Figure 23 is a fragmentary view in cross section through the thickness of a panel showing an embedded helix or anchor member for certain panel attachments.

Figure 24 is a half plan view of an end floor panel comprising an important feature of my novel construction.

Figure 25 is an end view of the horizontal panel shown in Figure 24.

Figure 26 is a transverse sectional view taken on line 26—26 of Figure 24.

Figure 27 is a view in side elevation of the portion of the panel shown in Figure 24.

Figure 28 is a modified sectional view as taken on line 28—28 of Figure 24, but showing the prefabricated steel skeleton construction, and temperature reinforcing.

Figure 29 is a view in central vertical section taken on line 29—29 of Figure 24.

Figure 30 is a side elevation view similar to Figure 27 but taken on on the opposite side of the panel shown in Figure 24, and showing the locations of the edge welding elements.

Figure 31 is a fragmentary detail view taken substantially on line 31—31 of Figure 24 and showing the manner of welding of a floor panel to one of the columns of an abutting end wall panel.

Figure 32 is a similar view showing the way an end of a floor panel is attached to a column of a side wall panel, and also a column element for the attachment of exterior details.

Figure 33 is a fragmentary sectional view taken substantially on line 33—33 of Figure 24 and showing one form of anchor for the reception of panel accessories.

Figures 34-45 are diagrammatic views, in front and side elevation alternating, of a variety of column constructions available for making up the wall panels; utilizable complementary severed portions of the blanks used being indicated by broken lines.

Figure 46 is a fragmentary horizontal sectional view through one wall of the building showing one manner of connecting the wall and floor panels, and showing suspended sub-panels.

Figure 47 is a view of the same structure shown in Figure 46 in which the section is taken in a plane perpendicular to that of Figure 46, and showing the interior of the wall panels in elevation and the floor panels in vertical section.

Figure 48 is a fragmentary enlarged view in vertical section of a main floor panel inverted as cast on a platen.

Figure 49 is a fragmentary longitudinal sectional view of one end of the same panel in the same position.

Figures 50 and 51 are fragmentary sectional views taken through the adjacent portions of floor and wall panels showing the manner of making a temporary supporting connection before welding the panels together.

Figures 52-61 inclusive are end views of a variety of floor panel beams made up from standard rolled shapes.

Figures 62 and 63 are fragmentary views in side elevation and bottom plan respectively of a floor panel beam showing one form of construction.

Figure 64 is a fragmentary view in vertical cross section of the head of a window frame as precast in one of the wall panels.

Figure 64A is a fragmentary horizontal sectional view through a window jamb.

Figure 64B is a similar view through a window sill.

Figure 64C is a fragmentary view in front elevation showing the detail at one corner of a window.

Figures 64D and 64E are enlarged views in elevation and plan respectively of a screw anchor of the type shown in Figure 64B.

Figures 65, 65A, and 65B are fragmentary views taken respectively through the head, the jamb, and the sill of a door frame forming a part of one of my novel wall panels.

Figure 66 is a framentary horizontal sectional view through a corner wall joint provided at the intersection of an end wall panel and a side wall panel of the building structure.

Figure 67 is a fragmentary horizontal sectional view through an intermediate wall panel joint.

Figures 68 and 68A are fragmentary plan and vertical sectional views through a floor joint of one type contemplated by the present invention.

Figures 69 and 69A are similar views of another embodiment of floor joints comprised within the invention.

Figure 70 is a fragmentary transverse horizontal sectional view through one of the wall panel columns showing means for attaching exterior details to the wall panels.

Figure 70A is a view in side elevation of the column and connection shown in Figure 70.

Figures 71 through 75A inclusive are fragmentary vertical sectional views taken through floor panels and showing various alternative constructions, including different forms of suspended and beam ceilings, for full and skeleton prefabrication.

Figures 76 and 77 are fragmentary horizontal sectional views through two forms of corner joints showing the details of connection of the steel reinforcing and supporting elements of the adjacent panels.

Figure 78 is a similar view through an intermediate joint between wall panels.

Figures 79-84 inclusive are diagrammatic views illustrating a preferred method for the general construction and assembly of a typical prefabricated building embodying the principles of my invention; Figure 79 being a diagrammatic architectural view through one floor of the building, and Figure 80 being a diagrammatic front elevation thereof. Figure 81 is a diagram in side elevation of the building under construction and showing the positioning of one of the upper floor or roof panels by a crawler crane. Figure 82 is an end elevation in diagrammatic form of a partially erected building showing two stages in the progress of the work. Figure 83 is a view similar to Figure 81 showing a traveling derrick employed in the erection of the building. Figure 84 is a fragmentary front elevation of the upper stories of the building showing still another method of erection.

Figure 85 is a view substantially in plan of a wall panel as it is delivered to the site of the building and showing the attachment of the lifting tackle, and auxiliary tilting tackle.

Figure 86 is a view in plan of a manually controlled falls for attachment to the panel, when auxiliary tackle is lacking.

Figure 87 is a view in perspective of a wall panel being erected by means of a crawler crane.

Figure 88 is a view in perspective of the interior of a partially completed building and part of the erecting apparatus showing progressive stages in the attachment of the wall and floor panels.

Figure 89 is a view in perspective of a temporary column with spread base for use in assembling the panels.

Figures 90 and 90A are fragmentary views in side elevation and end elevation respectively of temporary towers for floor panel support.

Figures 91 and 91A are views in transverse vertical cross section and in top plan of a portion of a floor panel showing eye bolt connections.

Figures 92 and 92A are fragmentary plan and sectional views of parts of a wall panel showing eye bolt connections.

Figure 93 is a diagrammatic view in side elevation of a tractor truck and trailer loaded with two wall panels for transportation to the building site.

Figure 93A is a plan view of a wall panel as loaded on the transporting vehicle with strongback applied.

Figure 94 is a view in side elevation of a main falls bottom block and attachment to a panel.

Figures 95 and 95A are side and end elevation views respectively of a spreader forming part of the lifting tackle.

Figures 96 and 97 are schematic plan views of two structures of regular polygonal and circular outline respectively showing a preferred arrangement of floor panels, alternate floors at 90 degrees.

Figure 98 is a similar diagram of a building having a polygonal plan with a different floor panel arrangement.

Figures 99, 100, and 101 are similar diagrammatic views of other building plans susceptible of unit construction under the principles of my invention.

Figure 102 is a view of a dairy barn partly in side elevation and partly in vertical section approximately on line 102—102 of Figure 103.

Figure 103 is a view partly in plan and partly in horizontal section of the barn shown in Figure 102.

Referring first to the diagrams in Figures 1-5, it will be seen that the building represented therein comprises a foundation or basement wall BW with the ground line GL intersecting the wall and sloping somewhat from the front of the building rearwardly. The basement walls are provided with the basement window openings f and are designed to sustain the dead, live and other loadings of the entire building, which in this example comprises three stories and roof parapet.

The side walls of the building, such as that shown in Figure 1 are comprised of a plurality of prefabricated panels WI. These panels are of full building height and have integrally cast window frames Z formed therein, and include in their composite construction a pair of wall columns CI. All of these panels are set upon and anchored to the basement wall at the foundation line 3, and are connected together at their side edges by the wall joints J2, the nature and construction of which will be hereinafter more fully described. The reference characters JI designate the corner joints which serve to connect and trim the junction of the side and end walls. Diagrammatically shown in Figure 1 are the horizontal floor panels FI and the sloping roof panel F2 which is also provided in this figure with a suspended ceiling 4. A parapet safety fence DI is provided at the top of the wall panels.

Figures 2 and 4 show schematic plans of roof or floor diagrams of buildings constructed in accordance with the present invention, Figure 2 being substantially a plan view of the building shown in Figure 1. In Figure 2 the side wall panels WI having the intermediate joints J2 are connected to the end wall panels W2 by means of the corner joints JI. There are also clearly indicated the roof (or floor) panels F2. A half panel F3 is provided at the end of the building to complete the roof or floor, due to the staggered arrangement of the floor and wall panels which comprises a particular feature of my invention.

In Figure 4 an opposite end of a building from that shown in Figures 1 and 2 is suggested, but in this case the floor panels are elongated to form continuous spans supported at the two walls and on two intermediate lines. These panels are indicated at F6 and a half panel is provided at F7 to complete the floor area. Intermediate supporting columns are indicated at D10. The joints between the floor or roof panels are indicated in Figures 2 and 4 by the reference character J5.

In Figures 3 and 5 of the drawings, the floor panels employed are prefabricated only to the extent of the skeleton steel work, it being proposed to complete the panels by casting the concrete around them after erection of the building. The pairs of steel beams forming the basis of these skeleton panels are designated BI and the other reinforcing elements will be described in detail in connection with the presentation of the panel units. It will be sufficient to mention at this point—in addition to the beams BI—the strut reinforcing 33, the slab reinforcing 35, and the rod bracing 37. In Figure 3 the skeleton floor panels are designated F4 and joint constructions are later applied at the spaces J6 for expansion purposes and otherwise the floor or roof is cast continuous. In Figure 5 of the drawings skeleton panels for the continuous span floor units, similar to F6 in Figure 4, are designated F8, and the beams BI comprising the main tension members of these units are supported upon the intermediate columns D10 as well as attached to the wall panels which they abut. Half panels of the skeleton variety are also indicated at F5 and F9 in Figures 3 and 5.

In Figures 6-13 inclusive there is illustrated in somewhat more detail a building embodying the principles of my invention, this structure being of a somewhat more irregular outline, and having the floor plan interrupted by stair wells and other details, the whole arrangement illustrating the versatility and adaptability of the panel unit assembly.

Figure 6 shows a conventional architectural plan of the first floor of the building which comprises an apartment house having four 3-room-and-bath apartments on each floor. The entrance hall is indicated at E and the stair and public hall at H, this hall floor being provided with openings for the stack S, incinerator chute I, garbage chute G, heating and electrical ducts $h$ and $e$, and roof drains $d$. The kitchens are designated by the reference character K, the living rooms by LR, bedrooms by BR, bath by B, and the closets by C. Certain of the rooms of the front apartments such as the kitchens KI, living rooms LRI, and bedrooms BRI, are slightly smaller on account of being opposite the entrance hall E. Obviously, the basement plan could be a similar half story arrangement and provided with heating and locker spaces.

Figure 7 shows an identical floor plan to that shown in Figure 6 with certain of the room partitions, fixtures, and other details being omitted, this figure being intended to show the arrangement and interconnection of the prefabricated multiple-span floor panels F9 and F10 over intermediate supports, single span floor panels FI, and partly prefabricated hall floor panel FII, the last named having stair, stack, and chute wells therethrough. The figure also shows the floor joints J5 and the prefabricated side and end wall panels WI and W2 with the corner and intermediate wall joints JI and J2. There are also employed in this arrangement certain prefabricated spandrel wall panels W4, W5, and W6, and corner wall panels W3. These spandrel wall panels may be of full building height or may extend merely from floor to floor, and these spandrel walls may be considered as comprising particularly wide joint structures comparable to the joints J2 of the wall construction. However, additional narrow and odd shaped joints preferably of special construction are indicated at J3 and J4 between the spandrel wall sections and the main side wall units.

There is shown in Figure 8, which is an elevation of the building as disclosed in Figures 6 and 7, the multiple storied wall, corner, and spandrel panels WI, W3, W4, W5, and W6 with the various joint arrangements, and surmounted by the parapet fence DI. The central spandrel panel W6 includes the door and the window openings and the decorative details D4. The spandrel panels W5 are disposed at an angle to give the bay window effect and they may be provided with the details D2 and bounded by the joint constructions J4.

All of the joint arrangements may be surmounted by the weather-proof caps D5 at the parapet. A canopy D3 may be applied to the central front wall panels over the main doorway. The sidewalk level is indicated at SW and it will be seen that this level is slightly below the top of the basement or foundation wall.

This layout demonstrates that my improved interlocked panel construction has sufficient flexibility to take care of any architectural demands of space, hallways, bay windows, stacks, chutes, interior columns, etc.

In Figures 9 and 10 there is illustrated a floor to floor section of one of the prefabricated spandrel wall sections W4 showing the integrally formed window frame, the ornamental detail D2 and the joints J3 between the panel W4 and the adjacent supporting wall panels WI and W3. Embedded in the side edges of the main wall panels W1 are the U-shaped attachment elements 6 to which the adjustable hangers 5 are connected. The side frames 7 of the spandrel panel W4 are suspended from these hangers 5 in alignment with the panels W1 and then the joints J3 may be poured. Prior to pouring the joint J3 the face plate overhang 8 is applied against the front edges of the panels W1 and W4.

The parapet cap D5 is a balanced self-centering and streamlined weather-free element which surmounts and straddles the joint between the panels at the top ends thereof. The construction and arrangement of this member is clearly shown in Figures 11, 12, and 13 of the drawings. The cap D5 is provided with self drains 9 and water tables 10. Certain overlapping secondary reinforcing elements 11 are embedded in the edges of the prefabricated wall panels W1 and project into the joint J3, the joint comprising the front facing sheet 12 and the backing fill 13.

A typical prefabricated unitary main wall panel W1 will now be described. One of such panels is clearly disclosed in Figures 14–23 of the drawings, Figure 14 being a top plan view of one of the panels as it lies face downwardly upon a platen upon which it is cast. The composite panels comprise reinforcing steel work about which concrete is poured and allowed to set. The main members of the reinforcing system for the panel are the columns C1 which in this example, and as preferred, comprise T-shapes having their base flanges uppermost and exposed and their webs embedded in the concrete of the panel and tapered in depth from top to bottom, as clearly shown in Figure 21 of the drawings. Door and window openings are provided in this particular panel and the frames O and Z thereof are preferably temporarily sustained by the bracing elements TB. At the ends of the columns C1 which are to be disposed at the bottom of the panel when erected, there are provided lugs C1b. At intermediate points on the exposed flanges of the columns C1 there are provided lifting lugs C1a, the purpose of which will be hereinafter more fully described. Horizontal reinforcing rods 14, vertical reinforcing rods 16, and diagonal bracing reinforcing rods 17 are interconnected with the columns to form a skeleton network about which the concrete may be poured for completing the composite panel. Reference numeral 15 designates certain supports or chairs by means of which the columns C1, the horizontal reinforcing rods 14, and the vertical reinforcing rods 16 may be interconnected. A detail view showing this construction is afforded by Figure 22. Each of the columns C1 is provided with encircling helical reinforcing windings 21, and when poured in suitable forms the concrete assumes a shape clearly shown in the figures of drawing in which there extend from the front wall of the panel (contacting the platen) the concrete webs or struts 18 and the side edge or joint walls 19. A concrete self-draining parapet edge is shown at 20.

For the purpose of providing an anchorage for lifting bolts, a helix 26 is embedded in the concrete surrounding each column C1 and directly beneath an opening in each lifting lug C1a. The center of the helix 26 is free of concrete and this embedded helical member provides a very secure anchor for the lifting eye bolts which are applied to the panels.

In Figures 17 and 18 the panels W1 are shown in position upon the foundation wall BW. The base ends of the columns C1 are disposed upon the half base plate 22, the panel is pulled to "face" and then the final half base plate 22A is positioned and shimmed. This detail is more clearly shown in Figure 19 of the drawings. Shims 23 are disposed, as necessary, beneath the edges of the plates 22 and 22A and anchor bolts 24 are embedded in the foundation wall 3 and the upwardly projecting ends pass through enlarged openings or slots 24A and are laterally welded to the faces of the column lugs C1b. A grouting 25 is first applied under the base plates 22 and 22A, and after positioning all dead loadings, between the bottom edges of the panels and the foundation wall.

The location of the floor panels F1, the roof panels F2, the ceilings 4, and the parapet fence post D1 are clearly shown in Figure 17.

To the inside surface of the completed panel unit there may be applied water proofing paper layers D6 above which may be applied metal or other lathing or wall board D8. Within the recesses of the composite panel and between the paper and lathing there may be inserted rock wool or other insulation D7.

Within the contemplation of the present invention, the panels may be prefabricated to any desired degree. As suggested in the diagrammatic Figures 3 and 5, and shown in Figure 21, a steel skeleton panel may be erected and the concrete thereafter applied; or as generally preferred, the composite panel is cast on a platen as shown in Figures 14, 15, and 16; or, finally, the composite cast panel may have the insulation lathing and other trim applied thereto before erection and assembly.

A construction and arrangement of the floor and other horizontal panels will now be described, with particular reference to Figures 24–33 of the drawings. The floor panel F10 shown is an end panel of the multiple span type which must be provided with intermediate supporting columns, and it will be understood that smaller single span panels embody the same principles of construction but omit these intermediate supporting means. The preferred details of construction of the reinforcing and attaching elements are however the same in both cases.

Figure 24 is a plan view of approximately one-half of a three span continuous floor panel as it would appear in position in the building or lying upon the vehicle upon which it is transported to the building site. Figure 24 would thus be a bottom plan view of the panel as it lies upon the platen. The main skeleton reinforcing members of the horizontal panel F10 comprise the continuous inverted T beams B1. Strut reinforcing elements 33 of steel transverse the width of the panel adjacent both surfaces as shown in Figures 25, 26, and 28. Other transverse reinforcing elements 35 are embedded in the main slab of the composite panel adjacent the floor surface. Special horizontal shear rods 36 are also employed as indicated in the sectioned portion of Figure 24, these elements being somewhat similar to the corresponding ones shown in my Patent No. 2,271,592. All of these bracing elements may be suitably attached to or supported from the web of the T beam. Diagonal brace members 37 may be disposed preferably in a plane just below the slab reinforcing network 35. The bracing rods and elements of the panel are welded to the steel beams B1 during the prefabrication of the skeleton frame, the concrete is poured around the steel skeleton to form the intermediate sub-beams 27 disposed between the steel beams B1, and the cantilevering concrete sub-beams 27A extending beyond the two steel beams. Edge walls 28 are formed on the panel and these may be notched or indented as at D11 for the reception of joint mesh and filler concrete between the floor panels F10 and the adjacent panels forming the floor structure. Concrete sub-beams 27C are also provided transversely of the panel above the intermediate supporting columns D10.

Anchoring means for the attachment of eye bolts or other lifting accessories are indicated at D9 and they comprise the plates D9a and the threaded pipe sections D9b which are disposed beneath the opening in the plate D9a and are welded to the base flange of the beam B1 as clearly shown in Figure 33 of the drawings.

At the ends of each of the beams B1 adjacent the upper surface of the panel are secured the connection angle elements 29 and similarly secured to the beams B1 adjacent the under surface are the connection angles 30. At intervals along the edge of the panel which occurs adjacent the end wall of the building there are secured the side connection plates 31 which are welded to the reinforcing system of the panel. All of these connection plates 29, 30, and 31 provide welding points for securing the panel to the adjacent wall columns C1, whether of the side wall panels W1 or the end wall panels W2. This welding indicated at 32, is most clearly shown in Figures 31 and 32 of the drawings.

This mode of connection of the floor and wall panels is further disclosed in Figures 46 and 47, several floor panels being indicated at F11 and main wall panels at W1. Joints between the wall panels are indicated at J2 and intermediate suspended floor panels F12 are supported by cantilever portions of the main floor panels F11. It will be clearly seen from these figures how the beams B1 of the floor panels abut the columns C1 of two adjacent wall panels and it will be readily apparent how the connecting plates of the beams are welded to the columns C1 according to the details shown in Figures 31 and 32. In Figures 46 and 47 the under connecting angle plates 30A, forming part of the floor panel assembly are extended from beam to beam. The reference character J7 indicates the point of application of joints between the supporting floor panels F11 and the intermediate floor panels F12. This form of construction is particularly adapted to buildings having floor covers such as parquet or other arrangements.

An important feature to note in connection with Figures 46 and 47 is the staggered or mutually overlapping arrangement of the respective wall and floor panels. In other words, each wall panel W1 straddles the joint between two main floor panels, and each floor panel F11 bridges the joint between two wall panels W1. This is one of the more important novel features of the present invention.

In Figures 48 and 49 end and side portions of the floor panels are shown in inverted position and the positions of the reinforcing rods 33 and 35 clearly indicated, together with the chaplet or chairs by which these rods are connected with the beam B1. These figures also show a modified supporting angle member 30B which may be connected to a column C1 by means of permanent shear bolts instead of by welding. These bolts are adapted to pass through holes 47 in the angles 30B.

In Figures 50 and 51 there is shown means for affording a temporary support of a floor panel F1 from a wall panel W1 prior to drawing the panels firmly into place and welding. The eye bolts E3 are threaded into the socket or anchoring means C1a provided in the wall panel and the connecting angle element 30 of the floor panel has its vertical flange resting upon the eye bolt behind the shoulder E30.

Certain alternative forms of steel column elements for the skeleton structure of the wall panels, and means for providing them from standard shapes with a minimum loss or waste of material, will now be described with particular reference to Figures 34 to 45 inclusive. In Figures 34 and 35 an elongated I-beam is used as a blank and a diagonal cut is taken through the web of the beam to provide a half 38 which may be employed as one of the columns C1, and another half 38A which may be employed to provide another of these columns. Openings 14A are made in the web to receive the rods 18A of the struts 18 of the panels W1, as shown in Figures 14 et seq. already described. The broken lines 39 indicate the approximate locations of floor and roof levels as referred to the length of the columns C1.

The alternative multiple story wall panel columns C2 shown in Figures 36 and 37 are made of two parts which are cut from light and heavy I-beam sections as shown in Figure 37. These sections are butt welded at 40 and the leftover portions of the beam blanks may be employed in making other columns.

The column C3 shown in Figures 38 and 39 is the same as the column C1 except that the column base is spread over the foundation wall by means of wing plates 41 welded on each side of the beam flange which plates are the same as those designated C1b in Figure 14 to which the anchor bolts 24 are welded.

At C4 in Figures 40 and 41, a modified form of column is shown in which a plate 42 is welded onto one base flange of the T-beam to provide any increase in the steel section which may be required. In the arrangement shown at C5 in Figures 42 and 43, plates 43 are welded to the base flanges of the T-shape to increase the section for substantially the full height of the floor face of the column. A similar arrangement is shown at C6 in Figures 44 and 45 in which the column is made up of two tapered plates 44 and 45 welded together at intervals along the lengths to form a T structure with a tapered column section.

In Figures 52–63 inclusive there are illustrated several alternative forms of floor beam construction together with the welded shear rods 52 which are disposed in notches cut in the vertical web of the beam. In Figure 52 the beam B1 comprises a T section which may be cut from an I-beam, in a fashion somewhat similar to the procedure illustrated in Figures 34 and 35 in connection with the columns C1. In Figure 53 the beam B2 comprises an angle section with a flat plate 48 welded thereto for either its full length or for only a portion of the length thereof, as for example, as shown in Figures 62 and 63 at B11 and 48A. In Figure 54 a plate 49 is welded to an angle member to form a T beam B3. In Figure 55 a split channel 50 has a plate 49 welded thereto to form a T beam B4. In Figure 56 the T beam B5 is made up from two perpendicularly disposed and welded flat plates, while in Figure 57 the T beam B6 is made up of three welded plates.

In Figure 58 the beam B7 is made from a bulb angle. In Figure 59 an I-beam is used to form the floor beam B8. In Figure 60 the beam B9 comprises a short T member together with two formed web plates 51 resistance welded to the web of the T for the support of the welded shear rods 52. In Figure 61 the floor beam B10 consists of a short web T with two deformed plates 53 resistance welded to the web thereof and having holes therethrough for the shear rods 52. The preferred spacing of the shear rods 52 along the beams is indicated in Figure 62 of the drawings. These shear rods may be fusion welded on top of the beam webs or may be let into depressions therein and welded to the beam. Alternatively they may be machine pressure and resistance welded.

The steel skeleton structure having now been described in many of its various modifications, the concrete portions of the panels and joints, together with means for applying various kinds of trim and accessories thereto will now be described. The application of a window frame to the wall panel is illustrated in Figures 64, 64A, 64B, and 64C of the drawings, this frame being designated by the reference character Z. In the example shown the frame Z is made of wood although other materials could be employed within the scope of the invention. Around the sides and tops of the window opening, coves 57 are provided which may be made of plastic or metal sheets. This arrangement avoids all special forming for sharp edges and curves of the concrete of the panel and affords continuous and accurate support for the window frame when placed upon the platen, the coves 57 being nailed to the window and door frames and serving to support them at the proper height above the platen. Interior beads of metal or plastic are indicated at D12 which items together with the interior plaster D13 are added after the erection of the panels.

In the sill arrangement as shown in Figure 64B, a sill cove 57A is provided with a special anchoring means including the screw anchor 58 (shown in detail in Figures 64D and 64E). The legs of this coiled anchor 58 are nailed to the window sill and a screw 59 threaded into the coiled portion, this screw being removable after the erection of the panel to allow the attachment of suitable plastic or metal flashing 60 for the sill structure. The flashing 60 is laterally entered beneath the cove 57A as precast in the panel. These features are shown in elevation in Figure 64C of the drawings. The framing and other elements being shown with rounded corners as at 2A. For securing the wooden frames to the panels, nails or brads are partially driven into the margins of the frames with the heads projecting for embedment in the concrete of the panel.

Similar views showing the construction and arrangement of a door frame O are afforded by Figures 65, 65A, and 65B. Similar coves 57 are employed in this case and beads D12 are also used for the edging of the plaster D13 around the door frame. The door sill 61 is anchored to the panel W1 by means of the spikes 61A which are similar to the brads or nails indicated for the same purpose in connection with the window frames. In Figure 65B the panel W1 is shown resting upon the foundation wall BW, and abutting the first floor panel F1 which has a suitable floor covering D14, such as linoleum, applied thereto.

Several detailed showings of joint structures appear in Figures 66 to 69A inclusive. Figure 66 represents a corner wall joint J1 joining the side and end wall panels W1 and W2. Wire mesh strips 62 are embedded partly within the side wall of the panels W1 and W2 and one flange of each of these mesh strips projects into the space at the corner of the structure which the joint J1 is to occupy. These projecting flanges of the mesh strips will be embedded in the concrete 67 of the final joint structure. A plastic or metal corner form or cove 63 comprises the permanent exterior form for the corner joint J1. This form or cove is sprung into grooves or depressions in the outer corners of the wall panels. The central portion of the cove or form 63 is tied or anchored to the temporary inner form block 64 by means of the galvanized tie elements or wires 65. The block 64 and the inwardly projecting portions of the tie elements are later removed and the plaster D13 may be extended around the inner corner of the structure. Additional galvanized metal mesh anchors 66 may be interspersed in the material of the joint J1 as described. When these forms and ties are in position a light concrete mix (for example "Haydite" or "Waylite," slag, or sawdust concrete) is poured to form the main body of filler of the joint. The corner joint J1 may be poured in one operation from the top of the parapet to the foundation in the case of a relatively low building or it may be applied in separate operations for high buildings, the cove 63 in the latter case being applied in sections and properly lapped.

In Figure 67 an intermediate wall joint J2 is shown, corresponding parts to those in Figure 66 being similarly designated. However, the outer joint form or cove, preferably made of flexible enameled metal or of aluminum alloy, is of less width and the inner temporary form block 64A may comprise a straight board.

In Figures 68 and 68A, there is illustrated an exemplary joint J5 between adjacent edges of floor panels F1 or F2. A ceiling D15 may be suspended from this structure. The joint itself comprises the filler concrete 72 which is poured in around the zig-zag reinforcing wire 69 from the convolutions of which is suspended the galvanized metal tie elements or wires 71. The bottom block of the joint to which the lower end of the elements 71 are secured may comprise in this case the wire conduit 70. A modified form of floor joint to transfer live load shears is shown in Figures 69 and 69A, in which the ceiling is formed substantially integrally with the joint or which may be added after erection. A form block 64A is used in this case at the lower edge of the joint; series of wires 69A occupy the wider upper portion of the joint and a special joint locking spiral element 73 is embedded within the wider keying portion of the joint structure which enters the marginal indentations in the panel edges such as suggested at D11 in Figures 25 and 26. The joint concrete is then poured and the upper surface trowelled smooth with the floor line.

In Figures 70 and 70A there is shown an arrangement whereby exterior details, for example marquee tie rods or similar supports for fire escapes, awnings, balconies, or other details may be attached to the platen face of the wall panels. A short T-shaped section 74 is welded web to web to the column C1 of the panel and embedded in the concrete. An external flanged member D17 is bolted or welded to the element 74 and the projecting web of this member is pierced by a clevis bolt for the attachment of clevis D16 and rod.

In Figures 71, 72, and 73 there are illustrated several types of suspended ceiling arrangements which may be supported from the series of floor panels. In Figure 71 the ceiling 4 is supported from the floor panels by means of the galvanized wire element 75 which are embedded in the floor panels when they are cast and are provided with extension eyelets which may be bent vertically downward when the ceiling is to be installed, and to which the extension wires D18 may be fastened. These extension wires are secured at their lower ends to the ceiling supporting channels D19 to which are connected the transverse pencil rods D20 which carry the metal lath or wire mesh D21 and the plaster of the ceiling. On top of the metal lath there may be placed or blown mineral wool or rock wool insulation D22. This provides a four hour fireproof insulated floor and ceiling structure. In Figure 72 an alternative form of ceiling attachment is shown which will provide a three hour fireproofed floor or roof. The ceiling 4 is suspended by the wires 75 which are long enough to extend down to be directly connected with the ceiling structure. The plastering in this case will protect the bottom flanges of the floor beams B1. In Figure 73 the floor beams B1 are protected by enveloping concrete to which the ceiling is applied for four hour fireproofing.

As pointed out in connection with Figures 3 and 5 of the drawings the floor panels may be assembled in the building structure as skeleton panels comprising only the steel beams and reinforcing elements, and then the concrete of the panels may be poured in situ. Figures 74-75A show one means of casting these panels after the skeleton units have been put in place. Metal forms D23 underlie the body of the panel, wooden plates are disposed beneath the depressed beam portions, and additional metal forms D24 are disposed between the wooden forms D25 and the metal forms D23, at each side of the beam. Spacing chairs D25a are interposed between the base flanges of the beam and the form is tied to the beam by means of the wires D24a. The concrete is then poured and after the forms D23, D24, and D25 are removed, the completed panel will be as shown in Figure 74A, ready for painting or trimming. In this way a four hour fireproofed floor with beamed ceiling may be provided by the use of skeleton prefabricated panels.

In Figures 75 and 75A there is shown a four hour floor of the usual steel cage construction, in which the beams and sub-beams may be erected separately as for example in the case of the hall floor panels F11 of Figure 7. Wooden form elements D26 are suspended from the steel skeleton frame work by means of wire suspended elements and the concrete is then poured. The finished floor and ceiling structure is shown in Figure 75A.

Figures 76, 77, and 78 show alternative joint arrangements between wall panels which have been provided with special integral connection elements and which may be joined by fusion welding and concrete caulking, as opposed to the cast joints illustrated in Figures 66 and 67. When additional building rigidity is required and also where half wall panels are necessary from an architectural standpoint, short angle members or similar welding plates 76 are attached to the wall panel strut reinforcing of the type designated 18A in Figure 14. The abutting angle plates 76 of adjacent panels are welded together from either side as indicated at 76A in Figure 76 after the panels have been erected and prior to pouring the corner joint J1. Where half wall panels are necessary, either or both of the angle members 76 may be extended the full length of the wall panel and furnished with a base plate 77 and thus the continuous angles 76 may act as corner columns.

In Figure 77 the corner joint which may be employed for minor buildings such as small homes, barns, garages, etc., is illustrated. In this embodiment welding plates 77 are embedded in the wall panel and attached to the transverse strut reinforcing 14, and the abutting portions of these plates of adjacent panels are welded together. The construction provides a simple mortar joint J comprising mortar 79 which is trowelled in and tooled.

Figure 78 shows an intermediate wall joint for similar small buildings in which two embedded plates 80 are welded to the reinforcement 14 and are provided with beveled edges. The adjacent beveled edges of the plates 80 are welded together and mortar applied to form the joint.

In Figures 79-83 inclusive there are depicted certain methods of erection of a building in accordance with the present invention, and several different types of equipment employed. Figure 79 is a conventional architectural plan of one floor of a wide span institutional building employing interior prefabricated wall panels for maximum fireproofing and high live loading. Both the exterior wall panels and the interior wall panels along the fireproofed corridor are given the reference characters W1. The end wall panels are designated W2 and certain intermediate or spandrel panels are indicated at W4. In Figure 80, an end view of the building, central panels W2a and connecting panels W4a are provided at the midportion of the building where the corridors and stairs occur, the stair platforms being located at mezzanine levels. The foundations are as usual indicated at BW and the ground line at GL.

Figure 81 is a view in side elevation of the building shown in Figure 79 in partially erected condition, the first floor panels F1 and F3 having been placed in position upon the foundation wall BW. Certain of the upper floor panels F1a have been deposited and entirely supported upon temporary towers E8, other floor panels being partially supported from the wall panels W1 which have been laterally placed in position and upon the temporary post supports E10. The wall panels W1 are spaced apart to receive the spandrel wall panels W4 which are to be erected later. A crawler crane E7 having a boom E7a is being employed to erect the panels of the building. The sequence of operations here is first to erect the several floor panels on the permanent foundations and on temporary braced bents; second, the full height wall panels W1 in opposite pairs are erected and connected to the positioned floor panels; third, pairs of wall panels and tiers of floor and roof panels are then erected successively with certain necessary temporary shores as provided. In Figure 82, an end elevation of the partially erected building shows first that one side of the building including the roof would be first completed; second, that the far wall of the corridor (as seen in Figure 79) would be erected together with all prefabricated wall panels and certain skeleton steel panels and the full height of the corridor; third, the crawler crane from its new position (shown in dotted lines) would then erect the other half of the building; fourth, all of the remaining end wall panels and the numerous spandrel panels would be placed in position; and fifth, the penthouse roof would be erected and items of trim and other details would be distributed to various floors and finally the exterior auxiliary parts comprising fire escapes, marquees, etc. would be applied.

In Figure 83, there is shown a stiff leg traveling derrick E13 with a boom E13a for erecting the building. The derrick is adapted to roll backwardly on the trucks or rollers 85 as the building assembly is completed, in substantially the sequence as indicated for Figures 81 and 82 above.

In Figure 84, which shows in elevation an upper portion of the building illustrated in Figure 80, there is employed a traveling stiff leg jinniwink E14 with a boom E14a for completing the erection of the building as it rolls forwardly and rearwardly on track timbers or rails laid on top of the roof panels on the portion of the building erected first. For erecting the starting tiers of the building, the jinniwink may be placed on a high temporary tower and then moved on to the building as the first section is completed. It is apparent that any combination of two or more crawler cranes, traveling derricks or jinniwinks may be employed in even more expeditiously completing the erection of the building, thus allowing the pouring of the joints, the waterproofing of the roof, the placing of all finishing trim, interior painting, and other procedures to be performed at many points simultaneously throughout the building and thus insuring a minimum of constructional carrying charges and the earliest possible occupancy.

Figures 85 to 95A inclusive are concerned with certain preferred and specific steps in the process of erecting a building under the plans of the present invention. These figures disclose certain special tools and equipment found to be particularly adapted for use in this connection.

In Figure 85 one of the wall panels W1 is shown in position, either upon the transporting truck or upon special supports arranged at the building site, and ready for erection by means of the boom E7a of the crawler crane E7. Figure 87 shows the same panel in the process of erection by means of the tackle connected to the boom of the crane, and Figures 86, 88, 94, 95, and 95A illustrate details of the lifting means which will now be described. The panel W' shown in Figure 85 is a 5 floor and roof wall panel, the upper or lighter end being at the top of the figure and the heavier base end being shown at the bottom thereof. The reference letters CL indicate the center line of the panel, the letters PP indicate the "picking point" or the point at which the spreader member E4 is disposed when the tackle is initially strained to raise the panel. The center of gravity of the panel is indicated at CG and it will be noted that the picking position is somewhat nearer the bottom of the panel than either the center of gravity of the center of panel height. The spreader beam E4 is suspended from the head of the boom E7a by the vertical main falls E5, and at each end of the spreader E4 are disposed sheaves 83 over which are trained the double ended slings E5a, the ends of each sling being attached to two lifting eyes E3 anchored in the panel near the top and bottom of the panel. The panel is thus supported from four spaced points and so as to swing vertically as the slings run on the sheaves 83. For tilting the panel there are provided runner falls E6 shown most clearly in Figures 86 and 87 and connected between a central point on the spreader beam E4 and a two way fixed sling E6a secured to the lower lifting eyes. With these two attachments of the runner falls near the bottom of the panel, and with the load and runner falls lead lines taut the picking up of the wall panel from a horizontal position and raising it to a sufficient height above the truck to permit releasing the runner falls and revolving the wall panel to approximately an upright position, is readily accomplished with a computable minimum handling stress in the panel. The controlling falls E6b illustrated in Figure 86 is a manually operated falls and is an alternative device to E6, Figures 85 and 87, which may be used to replace the preferred runner falls in case the hoisting equipment is not provided with a runner falls drum. The operation of the manually controlled falls will be readily understood, this arrangement insuring slower movement and requiring means by which the falls may be snubbed to the bottom of the wall panel.

In Figure 87 the position of the equipment and the panel is intermediate one between the picking up of the panel as depicted in Figure 85 and the application of the panel to the partially constructed building as shown in Figure 88. In this latter figure the panel is almost vertical (or at least at an elevation of about 85°) due to the continued releasing of the runner falls. The upper end of the boom E7a is clearly shown in Figure 88 as are also the other parts of the raising equipment.

The partially completed building shown in Figure 88 comprises the basement B with the basement or foundation walls BW and the floor panels F1 of the first, second, and third floors in position and supported respectively on the basement walls BW and on the temporary eye bolts E3 on those wall panels which are already in position, and further supported by the temporary towers E8 and the temporary posts or bents E10. These floor panels are supported at their mid points on their permanent columns D10. The end wall panels W2 are staid to the third floor horizontal panels by the guy wires E11, and also by fusion welding as previously described. Furthermore, the end one of the side wall panels W1 has been secured to the furthermost floor panels by welding, while the adjacent side wall panel W1 is still held in place firmly against the third floor panels by the pulling jack E12 of the guys E11a. As shown, the third panel W1 is the one which is being applied by the lifting tackle. This panel is still held by the boom E7a to which the main falls E5, spreader E4, and slings E5a are attached, the last named elements being secured to the temporary eye bolts E3 anchored in the panel. The base of the upended panel is being set upon the foundation wall BW and seated on the half foundation base plates 22, and against the anchor bolts 24 which are to be welded to the wings of the base of the column C1 forming part of the skeleton of the panel. The guys E11a have been connected to the intermediate eye bolts E3 of the wall panel preparatory to pulling the panel plumb by means of the pulling jack E12. As this last named operation is being done and just prior to contacting with the floor panels, the slings E5a are disconnected and the boom E7a and the crawler crane freed to proceed with the next operation. The detachment of the runner falls E6 has previously been effected, preferably prior to the actuation of the pulling jack E12.

In Figure 89 there is shown one of the posts E10 together with a brace 84 adapted for connection to one of the eyes E3. The post E10 is provided with an adjustable screw head 85 and also a similarly adjustable screw extension arm 86 for contacting the underside of the supported floor panel. This arrangement provides a post or temporary column and spread base with an inclined shore and base attachment for connection to the floor panel on which it is positioned, and an adjustable head and adjustable pushing arm at the top, whereby with one such column for each end of the floor panel being lowered upon the columns, the panel may be pushed slightly endwise either way to line up with the foundations and with the other floor panels, to the end that great exactness in alignment is possible. The fusion welding process is thus simplified especially since all of the floor panels have been prefabricated to the same exact length by the use of identical or uniform platens.

Figures 90 and 90A show in some detail the arrangement of the temporary towers or bents E8 for supporting the first series of floor panels before the erection of and connection with the laterally erected wall panels. The drawings show the application of these particular towers near the ends of the first positioned lower floor panels. Pushing jacks 86A, similar in function to the device 86 shown in Figure 89, are employed for making slight adjustments in the horizontal panels with regard to the supports. A tie down 84A secures the tower E8 to an adjacent temporary screw eye E3. Adjusting end leveling wedges 87 are employed to correct the position of the floor panels F1 to an arcuate horizontal plane. When these towers E8 are employed for the initial group of floor panels, the assembly acts as a guide and a wind force stabilizer during the assembling of the first wall panels after which the floor panels are fusion welded to the wall panels as the erection progresses. As described, the floor panels may be temporarily attached to the wall panels as clearly shown in Figures 50 and 51 of the drawings, by means of the eye bolts E3. Then, prior to welding, the floor and wall panels may be drawn firmly together by tightening the eye bolts.

As an alternative to the use of eye bolts with the anchoring helix shown in Figure 23, the lifting eye bolt installations for floor and wall panels may be adapted as illustrated in Figures 91 and 91A, 92 and 92A. In Figures 91 and 91A the steel T beam B1 of the floor panel F1 is shown together with an embedded nut 88 which is fusion welded to the web of the T beam. Also, a spider 89 having a central collar 89A flush with the top of the panel is embedded in the concrete of the panel. The eye bolt E3 is threaded into the embedded nut 88 and the neck of the eye bolt is firmly braced by the spider to resist all side thrusts which may occur during the lifting and installing of the panels.

A similar arrangement adapted more particularly to wall panels is shown in Figures 92 and 92A. The steel columns C1 forming the main bracing and reinforcing elements of the wall panels W1 are shown provided with the eye bolt lugs C1a fusion welded to the base flange of the column. An embedded angle member 90 is welded at 90A to the web of the column C1, the vertical flange of the angle member is pierced and nuts 91 welded thereto upon either side of the flange. The eye bolt E3 passes through an opening in the lug C1a and is threaded into the nuts 91. The nuts resist direct pulls and the lugs C1a resist all side thrusts and the very heavy endwise shear when the panel is upended and the weight of the panels thrown upon the lifting eyes E3.

One method of loading and transporting the floor and wall panels is suggested in Figures 93 and 93A of the drawings in which a tractor truck E14 is shown having a towed swiveling truck E14a with a rocking bolster 92 which is adapted to support approximately one-third of the load of panels W1 to be transported. A trailer E15 provided with two bolstered spring trucks or equalizer arrangements support the balance of the load. For the proper distribution of the loading and preserving a minimum internal stress in the panels, temporarily applied heavy angle beams or strong-backs E13 are attached to the top of each panel and fastened thereto by the spaced eye bolts E3. These stiffening beams will effectively protect exceptionally thin or fragile panels, will not be needed for transporting and handling the larger and heavier panels. When the strong-backs or beams E13 are used the vertical flanges E13a thereof are provided with openings 93 for the attachment of the slings E5a and E6a of the lifting tackle.

In Figures 94, 95, and 95A certain refinements of the spreaders E4 are shown, these spreader beams being particularly adapted for handling floor panels which are to be maintained level and not upended as in the case of the wall units. A part of the main falls E5 is shown in Figure 94 with the spreader E4 attached thereto and the double ended slings E5a attached to the eye bolts E4 and trained around the sheaves 83.

Spreader E4 is shown in somewhat more detail in Figures 95 and 95A, and it will be seen that it is applicable to handling either wall panels or floor panels. The sheaves 83 are revoluble and fixed sheaves or spools 94 are provided inwardly of the sheaves 83. The revoluble or rotatable sheaves 83 are employed to support and guide the slings E5a in lifting and upending wall panels and the fixed sheaves or guides 94 are used in handling floor panels which are maintained in horizontal position. The eye bolt 95 serves to support the spreader E4 from the main falls and this bolt, extending through the spreader is freely rotatably supported by means of the ball race 96, and thus all panels may be freely rotated or angled for exact positioning.

The remaining figures of drawing show the adaptability of the present invention to a wide range of buildings and to buildings of irregular outline. In Figures 96 and 97 there are shown schematically two buildings of regular pattern with the floor panels not only interlocking the wall panels of the side walls but also being arranged with the floor panels of alternating floors turned through an angle of 90°, and thus the floor panels of the odd numbered floors interlock to opposite sides of the building and the floor panels of the even numbered floors including the roof, interlock the other opposite sides. Thus the bracing effect is that of the strongest steel cage design. The wall panels W1 provided with joints J1 and J2 and the floor panels F2 and half panels F3 with joints J5 are clearly shown in Figure 96 with the corresponding floor panels of the floor below being turned through an angle of 90°. In Figure 97 this same principle is applied to a circular building, in which the wall panels WX and the floor panels FX and FY are analagous with those described in connection with Figure 96.

Figure 98 is a view similar to Figures 96 and 97 but showing diagrammatically another building of regular pattern having wall panels W1, joints J2 and a central internal column or stairwell 97. A multiple beam floor panel 98 is centered on the stairwell 97 and two beam floor panels FZ radiate from the central panel 98 to interlock with the wall panels. This provides an excellent braced construction and illustrates further the adaptability of the present invention.

Figures 99, 100, and 101 illustrate more conventional building layouts indicating how interlocking may be obtained with uniform width wall panels WI and with floor panels of full or half width or other slight modifications. The floor panels may be crossed as in Figure 101 and they need be varied in shape as indicated at F20 in Figure 99, F21 in Figure 100 and F22 in Figure 101. Intermediate columns for supporting heavy loadings are shown in Figures 99 and 100.

In Figures 102 and 103 there is shown a dairy barn of ample capacity to stall 50 milch cows on the ground floor together with all necessary accessories. Two silos are incorporated in the barn construction, one of which may be used for corn and the other clover to provide all necessary green food. On the second floor sufficient grain and hay feed for about a year's supply may be stored and still have ample space for the usual dairy farm machinery and vehicles, entrance being had to the latter area by way of a ramp. The silo panels and the outer wall panels provide the only necessary support for the interlocking roof panels, while the heavily loaded second floor finds sufficient support in the silo panels, wall panels, and an intermediate row of interior concrete filled pipe columns, which later may also be used as stall posts.

The ground floor of the barn is indicated at 99, the hay feed and implement floor at 100 and the roof ventilator at 101. Straight side wall panels WI are provided as well as arcuate end panels WO each provided as usual with two columns CI for reinforcing and interlocking. A combined straight and arcuate wall panel at the juncture of the straight wall and the curved wall is indicated at WN. Arcuate panels of shorter radius of curvature are provided at WM for the silo walls. It will thus be seen that these wall panels together with the stall columns D10 carry all roof and floor loads to the foundations at 99. The silo walls have impervious surfaces and are provided with horizontal circular reinforcing welded at the caulked joints JM. Sector shaped multiple roof and floor panels FO and FG are provided adjacent the end of the barn, the reinforcing beams BI of which are arranged to converge or to form a V for attaching these panels to a column of the silo wall and to the outer wall panels WO. Special roof panels FN and FM and floor panels FG are provided to perform their particular functions at their appointed places. All of these arrangements illustrate the application of the invention to achieve great rigidity, strength, durability, and duplication of parts in the case of a very important shelter.

It is to be understood that the terms "vertical" and "horizontal" as used in the claims are not strictly limiting and the claims, under the doctrine of equivalents, are intended to include within their scope situations in which the elements to which these terms are applied are somewhat tilted from the true vertical, or slightly inclined or curved with respect to the true horizontal. For example, the "vertical" panels may comprise the walls of pyramidal or leaning structures, and the "horizontal" panels may form inclined ramps, roofs, roadways, or the like. It is further understood that the materials of which the various parts are composed may vary widely and may be any reasonable equivalents of the "steel," "concrete," and other materials set forth in the claims.

It will also be understood that various changes and modifications may be made in the arrangements and constructions illustrated and described herein without departing from the scope of the invention as defined by the following claims.

Having thus described the invention, what is claimed as new and desired to be secured by Letters Patent is:

1. A paneled construction comprising a plurality of wall panels, each of said wall panels including two spaced substantially vertical metallic columns having bases adapted to rest upon fixed supports to provide two-point bearing, said vertical columns being positioned within each wall panel at approximately the first and third quarter points of the width of the panel, a plurality of substantially horizontal panels, each of said horizontal panels abutting a pair of adjoining wall panels in staggered relationship, each of said horizontal panels including two spaced substantially horizontal metallic beams, the adjacent columns of said pair of adjoining wall panels contacting respectively the ends of the two beams of the said abutting horizontal panel, and means connecting said columns and beams.

2. The construction set forth in claim 1 in which vertical supports are provided under the horizontal panels at points intermediate their length and spaced from said wall panels.

3. A paneled construction comprising two opposed wall structures, each of said wall structures comprising a plurality of aligned substantially vertical wall panels, each of the wall panels including two horizontally spaced substantially vertical metallic columns having bases adapted to rest upon fixed supports, to provide two-point bearing, the pairs of columns being positioned within each wall panel at approximately the first and third quarter points of the width of the panel, and paneled structures extending between said opposed wall structures in substantially horizontal planes and each comprising a plurality of substantially horizontal panels in staggered relationship with respect to the wall panels of both wall structures, each of said horizontal panels abutting a pair of adjoining wall panels in both opposed walls, each of said horizontal panels including two spaced metallic beams, the opposite ends of said two beams contacting the adjacent columns of said pairs of adjoining panels of opposed wall structures, and means securing said beams and columns together at the points of contact.

4. The construction set forth in claim 3 in which vertical supports are provided under the horizontal panels at points intermediate their length and spaced from said wall structures.

5. A paneled building construction comprising, in combination, two opposed reinforced concrete wall structures and reinforced concrete floor-roof structures extending between and abutting said opposed wall structures, each wall structure comprising a plurality of substantially vertical reinforced concrete panels, each of said floor-roof structures, comprising a plurality of substantially horizontal reinforced concrete panels which are in staggered relationship with respect to the wall panels of both wall structures, each of said floor-roof panels abutting a pair of adjoining wall panels in both opposed walls, each of the wall panels containing two spaced metallic columns having bases adapted to rest upon a support to provide two-point bearing, said columns also having exposed portions facing inwardly toward the opposite wall structure at the floor-roof levels, the pairs of columns being positioned within each wall panel at approximately the first and third quarter-points of the width of the panel, each of the floor-roof panels comprising a pair of beams having longitudinally extending metallic elements with exposed ends, the opposite exposed ends of said two metallic elements respectively contacting the exposed portions of the adjacent columns of said pairs of adjoining panels of the opposed wall structures, means connecting said metallic columns and beam elements at said points of contact throughout the construction.

6. The construction set forth in claim 5 in which two additional opposed wall structures composed of panels similar to the first mentioned ones are provided to close the ends of the construction and means for connecting the columns of the panels of said end closing wall structures to the edges of the end panels of the floor-roof structures.

7. The construction set forth in claim 6 in which transverse metallic strut elements are provided in the end panels of the floor-roof structures, said strut elements having exposed ends adjacent the edges of said panels, the metallic columns of the panels of said end closing wall structure being exposed at floor-roof levels, and means connecting said strut ends to said last named columns at said exposed portions, and means connecting said columns, beams, and struts to provide an effective steel cage construction.

8. The construction set forth in claim 6 in which a plurality of floor-roof structures are used, the panels of the odd numbered structures extending between and having their ends abutting one pair of opposed wall structures and the panels of the even numbered floor-roof structures extending between and having their ends abutting the other pair of opposed wall structures.

9. The construction set forth in claim 6 in which certain of the wall panels are of lesser width, being curtailed at their edges outwardly beyond the columns, thus providing gaps between adjoining panels at predetermined locations, spandrel wall panels disposed within said gaps, and means for supporting said spandrel wall panels from the first named wall panels.

10. The construction set forth in claim 6 in which spaces are provided between the adjacent edges of the panels and relatively frangible joint structures are provided in said spaces, each of said joint structures comprising a filler of plastic material of low shearing value, to determine lines of rupture in areas of seismic and hurricane disturbances.

11. The construction according to claim 5 in which there are provided at floor-roof levels metallic tie members within the wall panel connecting the two metallic column elements of the wall panels, and forming a continuous strut and tie system through the floor-roof panel joints.

12. The construction according to claim 5 in which there are provided at the wall abutting ends within each floor-roof panel metallic tie members connecting the end portions of the metallic beam elements forming a continuous strut and tie system through the wall panel joints.

13. The construction as set forth in claim 5 in which the columns of the wall panels are tapered, the cross section diminishing from the bottom toward the top of said panel.

MEIER GEORGE HILPERT.

REFERENCES CITED

The following references are of record in the file of this patent:

UNITED STATES PATENTS

| Number | Name | Date |
|---|---|---|
| 1,060,853 | Pierce | May 6, 1913 |
| 1,326,400 | Halverson et al. | Dec. 30, 1919 |
| 1,340,291 | Pratt | May 18, 1920 |
| 1,386,417 | Marx | Aug. 2, 1921 |
| 1,484,206 | Berkholz | Feb. 19, 1924 |
| 1,563,593 | Schall | Dec. 1, 1925 |
| 1,597,167 | Pace | Aug. 24, 1926 |
| 1,622,962 | Michod | Mar. 29, 1927 |
| 1,714,987 | Pedersen | May 28, 1929 |
| 1,796,048 | Robinson | Mar. 10, 1931 |
| 1,924,801 | Olmsted | Aug. 29, 1933 |
| 1,970,617 | Morgan | Aug. 21, 1934 |
| 1,981,661 | Pfeifer | Nov. 20, 1934 |
| 2,000,885 | Davison | May 7, 1935 |
| 2,031,631 | Bemis | Feb. 25, 1936 |
| 2,050,290 | Earley et al. | Aug. 11, 1936 |
| 2,072,386 | Smallwood | Mar. 2, 1937 |
| 2,081,499 | Nagel | May 25, 1937 |
| 2,083,987 | Davis | June 15, 1937 |
| 2,091,140 | Davis | Aug. 24, 1937 |
| 2,001,451 | Parkhurst | Nov. 30, 1937 |
| 2,139,623 | Marston | Dec. 6, 1938 |
| 2,202,745 | Muse | May 28, 1940 |
| 2,213,718 | Reed et al. | Sept. 3, 1940 |
| 2,217,115 | Hermodsson | Oct. 8, 1940 |
| 2,318,058 | Colburn | May 4, 1943 |
| 2,331,083 | Smith | Oct. 5, 1943 |
| 2,372,200 | Hayes | Mar. 27, 1945 |

FOREIGN PATENTS

| Number | Country | Date |
|---|---|---|
| 402,971 | France | 1909 |
| 494,746 | Great Britain | 1938 |